United States Patent
Matsunoshita et al.

(10) Patent No.: US 7,301,654 B2
(45) Date of Patent: Nov. 27, 2007

(54) IMAGE DATA OUTPUTTING APPARATUS AND IMAGE DATA OUTPUTTING METHOD

(75) Inventors: Junichi Matsunoshita, Ebina (JP); Kengo Shinozaki, Ebina (JP); Koji Kameda, Ebina (JP); Hiroyuki Kawano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 916 days.

(21) Appl. No.: 09/923,446

(22) Filed: Aug. 8, 2001

(65) Prior Publication Data

US 2002/0054317 A1 May 9, 2002

(30) Foreign Application Priority Data

Aug. 25, 2000 (JP) ............................. 2000-255324

(51) Int. Cl.
  *G06K 15/00* (2006.01)
  *G06F 3/12* (2006.01)
(52) U.S. Cl. .................... 358/1.14; 358/1.15; 358/1.13; 358/1.2; 358/1.9
(58) Field of Classification Search ............... 358/1.14, 358/1.15, 1.18, 1.16, 1.17, 1.13, 1.11, 3.28, 358/1.1, 1.2, 1.6, 1.9, 2.1, 3.07, 437, 468, 358/407; 283/68, 69, 70, 93, 113; 382/100; 713/176
See application file for complete search history.

(56) References Cited

U.S. PATENT DOCUMENTS 5,291,243 A * 3/1994 Heckman et al. ............... 399/3
5,742,408 A * 4/1998 Funada et al. ............... 358/501
5,857,709 A * 1/1999 Chock .......................... 283/86
5,859,711 A * 1/1999 Barry et al. ................. 358/296
6,122,403 A * 9/2000 Rhoads ........................ 382/233

FOREIGN PATENT DOCUMENTS

| JP | A-3-30573 | 2/1991 |
| JP | A-7-231384 | 8/1995 |
| JP | A-2000-83123 | 3/2000 |

* cited by examiner

Primary Examiner—Dov Popovici
(74) Attorney, Agent, or Firm—Oliff & Berridge PLC

(57) ABSTRACT

An image data outputting apparatus and method form satisfactory images regardless of characteristics of an image forming apparatus by outputting copy forgery preventing image data for preventing copy-based forgery to the image forming apparatus. For example, a recording medium outputting system is constructed by connecting a LAN having a DB server managing transmission/reception of data to/from a database in the city office, and many LANs each having a terminal and a printer installed in a convenience store via a communication line and the Internet. Document data of a certificate is retrieved from the database in the city office by operating a terminal in a store, the retrieved document data is merged with copy forgery preventing image data corresponding to characteristics of a printer in the same store, and the merged data is outputted from the printer.

5 Claims, 18 Drawing Sheets

FIG. 3

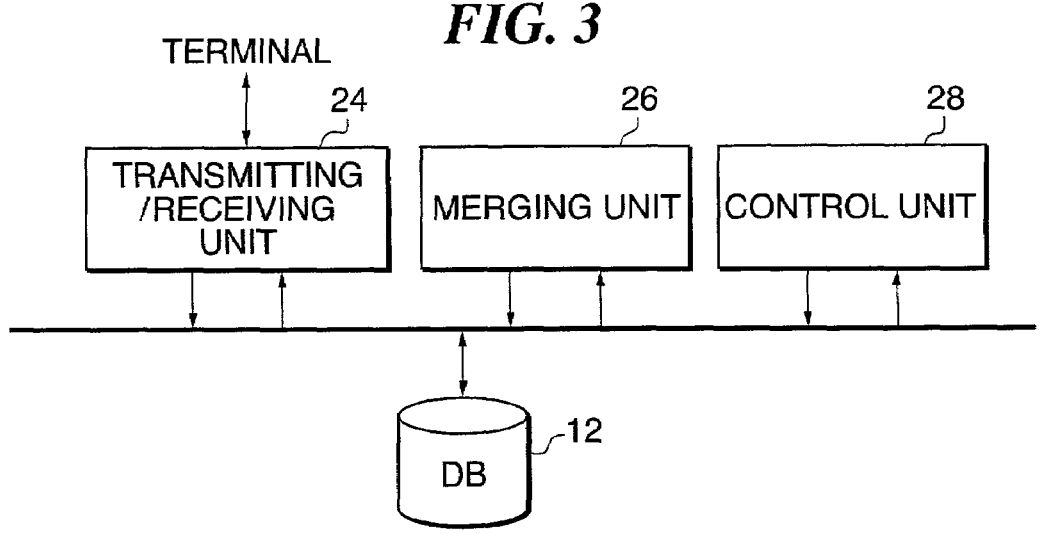

FIG. 4

| NAME OF MUNICIPALITY | KIND OF CERTIFICATE | PRINTER IP ADDRESS | LATENT-IMAGE-BURIED IMAGE DATA |
|---|---|---|---|
| ADACHI WARD, TOKYO | CERTIFICATE OF RESIDENCE | IP1<br>IP2<br>⋮<br>IP25<br>⋮ | LABGPR1<br>LABGPR2<br>LABGPR3<br>LABGPR2<br>LABGPR1<br>⋮ |
| | DOCUMENT CERTIFYING THAT A SEAL IS REGISTERED | IP1<br>IP2<br>⋮<br>IP25<br>⋮ | LABGPR4<br>LABGPR5<br>LABGPR6<br>LABGPR5<br>LABGPR4<br>⋮ |
| | COPY OF ONE'S FAMILY REGISTER | ⋮ | ⋮ |
| ⋮ | ⋮ | ⋮ | ⋮ |

FIG. 5A
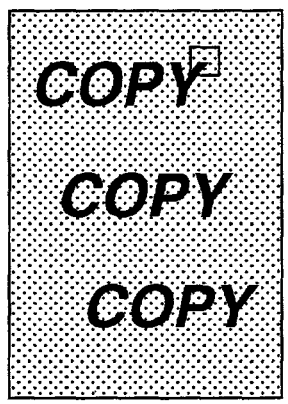
FIG. 5B
COPY
COPY
COPY
FIG. 5C
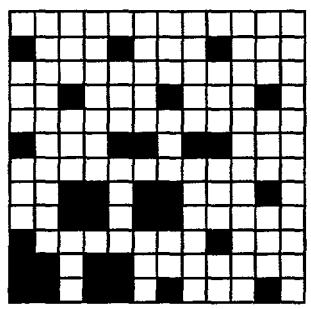
☐ WHITE PIXELS
■ BLACK PIXELS
FIG. 5D
```
0 0 0 0 0 0 0 0 0 0 0
1 0 0 0 1 0 0 0 1 0 0 0
0 0 0 0 0 0 0 0 0 0 0 0
0 0 1 0 0 0 1 0 0 0 1 0
0 0 0 0 0 0 0 0 0 0 0 0
1 0 0 0 1 1 0 1 1 0 0 0
0 0 0 0 0 0 0 0 0 0 0 0
0 0 1 1 0 1 1 0 0 0 1 0
0 0 1 1 0 1 1 0 0 0 0 0
1 0 0 0 0 0 0 0 1 0 0 0
1 1 0 1 1 0 0 0 0 0 0 0
1 1 0 1 1 0 1 0 0 0 1 0
```
FIG. 5E
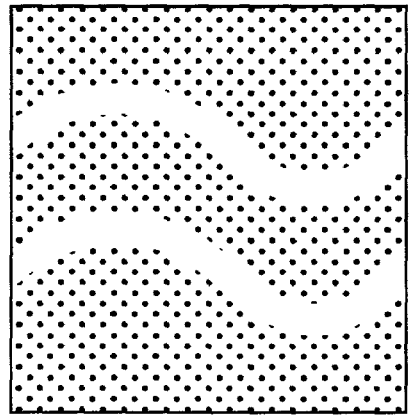
BACKGROUND IMAGE
ENLARGED VIEW
(CAMOUFLAGE PATTERN)
FIG. 5F
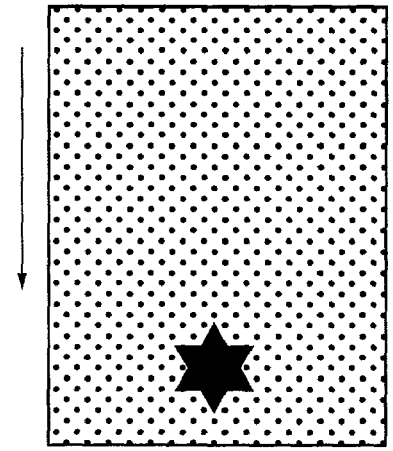
ENTIRE BACKGROUND
IMAGE

FIG. 10

| NAME OF MUNICIPALITY | KIND OF CERTIFICATE | BACKGROUND IMAGE DATA | MASK IMAGE DATA |
|---|---|---|---|
| ADACHI WARD, TOKYO | CERTIFICATE OF RESIDENCE | BG1 | LA1 |
| | DOCUMENT CERTIFYING THAT A SEAL IS REGISTERED | BG1 | LA2 |
| | COPY OF ONE'S FAMILY REGISTER | BG1 | LA3 |
| ARAKAWA WARD, TOKYO | CERTIFICATE OF RESIDENCE | BG2 | LA1 |
| | DOCUMENT CERTIFYING THAT A SEAL IS REGISTERED | BG2 | LA2 |
| | COPY OF ONE'S FAMILY REGISTER | BG2 | LA3 |
| ...... | ...... | ...... | ...... |

FIG. 20

| NAME OF MUNICIPALITY | KIND OF CERTIFICATE | BACKGROUND IMAGE DATA |
|---|---|---|
| ADACHI WARD, TOKYO | CERTIFICATE OF RESIDENCE | BG1 |
| | DOCUMENT CERTIFYING THAT A SEAL IS REGISTERED | BG1 |
| | COPY OF ONE'S FAMILY REGISTER | BG1 |
| ARAKAWA WARD, TOKYO | CERTIFICATE OF RESIDENCE | BG2 |
| | DOCUMENT CERTIFYING THAT A SEAL IS REGISTERED | BG2 |
| | COPY OF ONE'S FAMILY REGISTER | BG2 |
| ⋮ | ⋮ | ⋮ |

FIG. 21

| NAME OF MUNICIPALITY | KIND OF CERTIFICATE | IMAGE NUMBER |
|---|---|---|
| ADACHI WARD, TOKYO | CERTIFICATE OF RESIDENCE | 001 |
| | DOCUMENT CERTIFYING THAT A SEAL IS REGISTERED | 002 |
| | COPY OF ONE'S FAMILY REGISTER | 003 |
| ARAKAWA WARD, TOKYO | CERTIFICATE OF RESIDENCE | 004 |
| | DOCUMENT CERTIFYING THAT A SEAL IS REGISTERED | 005 |
| | COPY OF ONE'S FAMILY REGISTER | 006 |
| ⋮ | ⋮ | ⋮ |

FIG. 22

| IMAGE NUMBER | LATENT-IMAGE-BURIED IMAGE DATA |
|:---:|:---:|
| 001 | LABG1 |
| 002 | LABG2 |
| 003 | LABG3 |
| 004 | LABG4 |
| 005 | LABG5 |
| 006 | LABG6 |
| ⋮ | ⋮ |

IMAGE DATA OUTPUTTING APPARATUS AND IMAGE DATA OUTPUTTING METHOD

BACKGROUND OF THE INVENTION

1. Field of the Invention

The present invention relates to an image data outputting apparatus and an image data outputting method, and more particularly to an image data outputting apparatus and an image data outputting method that output copy forgery preventing image data for preventing copy-based forgery to an image forming apparatus for forming images, based on forgery prevention target image data to be protected from copy-based forgery.

2. Description of the Prior Art

A virtual shop for selling commodities on a computer network such as the Internet or intranet has the convenience that the user can purchase various commodities by accessing the shop from a terminal. The contents dealt by the virtual shops are rapidly increasing to tours, music, books, insurance, and the like. Through a virtual shop, various commodities can be sold without displaying the commodities in an actual shop. Consequently, in many convenience stores, multimedia terminals are installed.

In recent years, by providing or connecting a color printer in/to the multimedia terminal, real-time on-demand output service such as sales of a picture of a star is becoming available. Since the convenience of the virtual shop further increases by such real-time on-demand output service, expansion of the contents, for example, issuance of securities such as a gift certificate, various tickets such as airline ticket and show ticket, a certificate of residence, and the like is expected.

In spite of the fact that a picture of a star or the like can be copied by a color copier, under present circumstances, no measure of protecting the copyright and the rights to one's portrait is taken. There is also the possibility that a secret document such as a certificate of residence related to the privacy of an individual, securities and a ticket are forged or counterfeited by being copied. When a measure of preventing illegal copying is not taken, such a secret document cannot be directly outputted from a printer by operating, for example, the multimedia terminal installed in a convenience store.

Conventionally, to prevent illegal copying of a secret document, a special sheet called a copy forgery prevention sheet is used. The copy forgery prevention sheet is a sheet on which a special pattern of characters of warning or the like which is not easily seen by the eyes of a human but appears when the sheet is copied by a copier is printed in advance. When a document printed on the copy forgery prevention sheet is copied by a copier, letters of warning such as "copy prohibited" appear conspicuously on a copy. An illegal act of copying can be psychologically suppressed, and the original and a copy can be discriminated from each other by the characters of warning.

When such copy forgery prevention sheets are loaded in a printer installed in a convenience store or the like and document data read from a database by operating the multimedia terminal is printed on the copy forgery prevention sheet, a secret document such as certificate of residence, securities and a ticket can be directly outputted from the printer.

Since special printing has to be performed in advance, the copy forgery prevention sheet has a problem such its cost is higher than a sheet used by an ordinary copier or printer. In the case of changing a design of a background pattern, a logo, a symbol mark, or the like, printing on sheets has to be newly performed. Consequently, it is not easy to change something in the sheet.

As for an example of certificates such as certificate of residences issued by city offices, the city offices use copy forgery prevention sheets of kinds unique to the city offices, and also use different kinds of copy forgery prevention sheets, depending on the kinds of certificates. Therefore, users managing multimedia terminals must provide numerous kinds of copy forgery prevention sheets, locate copy forgery prevention sheets according to certificates, and exchange them with sheets placed on a tray to start printout, imposing heavy loads on the users. If the kinds of copy forgery prevention sheets are changed, post-change copy forgery prevention sheets must be distributed to users who install multimedia terminals. Moreover, the users must carefully manage copy forgery prevention sheets to prevent malicious use of them, and bear the management cost.

The applicant of the present invention proposes a recording medium outputting method that allows a recording medium to be printed without using copy forgery prevention sheets by performing printout after merging copy forgery preventing image data capable of preventing copy-based forgery according to forgery prevention target image data to be protected from copy-based forgery . U.S. application Ser. No. 09/853,576. According to the present invention, documents to be protected from copy-based forgery such as certificates issued by city offices can be outputted without using copy forgery prevention sheets.

However, two or more models such as monochrome printer and color printer may coexist in a convenience store or the like. Also, where printers are changed to a new model, it is difficult to replace all of a large number of printers at the same time, and there will occur a period during which new and old models coexist. On the other hand, where a recording medium printed by merging copy forgery preventing image data is to be outputted, although a copy forgery preventing image is buried as a latent image, it may be reproduced differently on the recording medium, depending on resolution and tone property, or printer characteristics specific to color printers and monochrome printers. As a result, the copy forgery preventing image, which should be latent, may be conspicuous depending on the model of a printer to which it is outputted, posing the problem of impairing the quality of a visible image.

SUMMARY OF THE INVENTION

The present invention has been made in view of the above-described problems of the prior art and provides an image data outputting apparatus and an image data outputting method that allow satisfactory images to be formed regardless of the characteristics of an image forming apparatus when copy forgery preventing image data for preventing copy-based forgery is outputted to the image forming apparatus, which forms images, based on forgery prevention target image data to be protected from copy-based forgery.

According to an aspect of the present invention, the image data outputting apparatus for outputting copy forgery preventing image data for preventing copy-based forgery includes a storing part for storing plural pieces of copy forgery preventing image data corresponding to characteristics of plural image forming apparatuses, a selecting part for selecting a piece of copy forgery preventing image data corresponding to a characteristic of an image forming apparatus specified for forming an image from the plural pieces of copy forgery preventing image data stored in the storing part, and an outputting part for outputting the piece of copy forgery preventing image data selected by the selecting part to the image forming apparatus specified for forming an image.

With this configuration, the selected piece of copy forgery preventing image data corresponding to characteristics of the image forming apparatus specified for forming images can be outputted; therefore, satisfactory output images can be obtained regardless of the characteristics of image forming apparatuses. Also, since a piece of copy forgery preventing image data stored in advance in the storing part is selected, the time required for outputting the piece of data is short.

In this aspect, the piece of copy forgery preventing image data may include at least a background portion constituted by a first pattern and a latent image portion constituted by a second pattern, and the selecting part may select the piece of copy forgery preventing image data so that, when an image is formed by the specified image forming apparatus, the background portion and the latent image portion are almost equal in density.

According to another aspect of the present invention, the image data outputting apparatus for outputting copy forgery preventing image data for preventing copy-based forgery includes a generating part for generating copy forgery preventing image data corresponding to a characteristic of an image forming apparatus for forming an image, and an outputting part for outputting the copy forgery preventing image data generated by the generating part to the image forming apparatus for forming an image.

With this configuration, copy forgery preventing image data corresponding to characteristics of an image forming apparatus can be outputted; therefore, satisfactory output images can be obtained regardless of the characteristics of image forming apparatus. Also, since copy forgery preventing image data is generated each time by the generating part, the storage capacity of a storing part is saved.

According to another aspect of the present invention, the image data outputting method for outputting copy forgery preventing image data for preventing copy-based forgery includes the steps of selecting a piece of copy forgery preventing image data corresponding to a characteristic of an image forming apparatus specified for forming an image from plural pieces of copy forgery preventing image data corresponding to characteristics of plural image forming apparatuses stored in a storing part, and outputting the selected piece of copy forgery preventing image data to the image forming apparatus specified for forming an image.

According to another aspect of the present invention, the image data outputting method for outputting copy forgery preventing image data for preventing copy-based forgery includes the steps of generating copy forgery preventing image data corresponding to a characteristic of an image forming apparatus for forming an image, and outputting the generated copy forgery preventing image data to the image forming apparatus for forming an image.

According to another aspect of the present invention, the image data outputting apparatus, which outputs a piece of copy forgery preventing image data for preventing copy-based forgery to an image forming apparatus for forming an image based on a piece of forgery prevention target image data to be protected from copy-based forgery, includes a storing part for storing plural pieces of forgery prevention target image data and plural pieces of copy forgery preventing image data, a retrieving and selecting part for retrieving a piece of forgery prevention target image data corresponding to information transmitted from a terminal from the plural pieces of forgery prevention target image data stored in the storing part and selecting a piece of copy forgery preventing image data corresponding to the retrieved piece of forgery prevention target image data and an image forming apparatus specified for forming an image, and an outputting part for outputting the retrieved piece of forgery prevention target image data and the selected piece of copy forgery preventing image data.

According to another aspect of the present invention, the image data outputting apparatus, which outputs a piece of copy forgery preventing image data for preventing copy-based forgery to an image forming apparatus for forming an image based on a piece of forgery prevention target image data to be protected from copy-based forgery, includes a storing part for storing plural pieces of forgery prevention target image data, a retrieving part for retrieving a piece of forgery prevention target image data corresponding to information transmitted from a terminal from the plural pieces of forgery prevention target image data stored in the storing part, a generating part for generating a piece of copy forgery preventing image data corresponding to the retrieved piece of forgery prevention target image data and an image forming apparatus specified for forming an image, and an outputting part for outputting the retrieved piece of forgery prevention target image data and the generated piece of copy forgery preventing image data.

Forgery prevention target image data to be protected from copy-based forgery referred to in the present invention includes images having copyrights, rights to one's portrait, and script data; the images having originality include images on certificate of residences, document certifying that a seal is registered, and the like issued from city offices, and images on securities; and the images on copyrights and rights to one's portrait include images on tickets, photographs, pictures of stars, and the like.

With these configurations, without using copy forgery prevention sheets, a recording medium on which an image has been formed based on the piece of forgery prevention target image data can be printed out.

In the case of generating the piece of copy forgery preventing image data, the information inputted from the terminal is allowed to include at least one of information regarding an operator of the terminal, information regarding a terminal of outputting a recording medium, and information regarding a timing of outputting a recording medium, and the piece of copy forgery preventing image data can be generated according to the information from the terminal. For example, a character string indicative of information such as the name or ID number of the terminal operator, the IP address of an output terminal, and time/day/month/year of instruction of outputting a recording medium is buried as a latent image. In such a manner, a latent-image-buried image according to the information inputted from the terminal can be generated. By generating a piece of copy forgery preventing image data in accordance with the information inputted from the terminal, a piece of copy forgery preventing image data of a different kind can be merged with the document data and the merged data can be printed on the recording medium. Consequently, in the case where illegal copying is made, the distributing path of the illegal copy can be easily traced.

The kind of the copy forgery preventing image data can be varied according to at least one of the kind of forgery prevention target image data and a source of providing the forgery prevention target image data. For example, latent-image-buried image data in which an image indicative of information such as the kind of the forgery prevention target image data and the source of providing the forgery prevention target image data is buried as a latent image can be used. By changing the copy forgery preventing image data in accordance with information such as the kind of forgery prevention target image data and the source of providing the forgery prevention target image data, the kind of the forgery prevention target image data and the source of providing the forgery prevention target image data can be easily determined.

The following arrangement is also possible. The copy forgery preventing image data is constructed of a background portion which is not copied by a copier and a latent image portion reproduced by the copier, or of a background portion which is copied by a copier and a latent image portion which is not reproduced by the copier, and the kind of the copy forgery preventing image data is varied by changing the shape of the latent image portion or at least one of a color of the latent image portion and a color of the background portion. In this case, the color of the copy forgery preventing image data to be merged can be changed according to at least one of the kind of the forgery prevention target image data, the source of providing the forgery prevention target image data, and a timing of outputting a recording medium. By changing the color of the copy forgery preventing image in accordance with at least one of the kind of the forgery prevention target image data, the source of providing the forgery prevention target image data, and the timing of outputting a recording medium as described above, the kind of the forgery prevention target image data, the source of providing the forgery prevention target image data, and the timing of outputting the recording medium can be easily determined.

It is also possible to vary a charge in accordance with at least one of an operator of the terminal, the kind of forgery prevention target image data, presence/absence of an advertisement in the recording medium, a position of outputting the recording medium, and a timing of outputting the recording medium.

BRIEF DESCRIPTION OF THE DRAWINGS

Preferred embodiments of the present invention will be described in detail based on the followings, wherein:

FIG. 3 is a block diagram showing the configuration of a database server;

FIG. 4 is a diagram showing an example of a table containing latent-image-buried image data stored in a database;

FIGS. 5A to 5F are diagrams for explaining latent-image-buried images;

FIG. 10 is a diagram showing another example of a table containing latent-image-buried image data stored in a database;

FIG. 20 is a diagram showing an example of a table containing background image data stored in a database;

FIG. 21 is a diagram showing an example of a table containing the image numbers of latent-image-buried image data stored in a database; and FIG. 22 is a diagram showing an example of a table containing latent-image-buried image data stored in the memory of the print server.

DESCRIPTION OF THE PREFERRED EMBODIMENTS

Hereinafter, embodiments of the present invention will be described in detail with reference to the accompanying drawings.

First Embodiment

In a first embodiment, the present invention applies to a document output system in which secret information document data (e.g., a document such as a certificate of residence, a copy of one's family register, document certifying that a seal is registered, etc.) is retrieved from a data base of a city office, using a terminal placed in a convenience store, and the document is outputted from a printer installed in the store.

Figure 1:
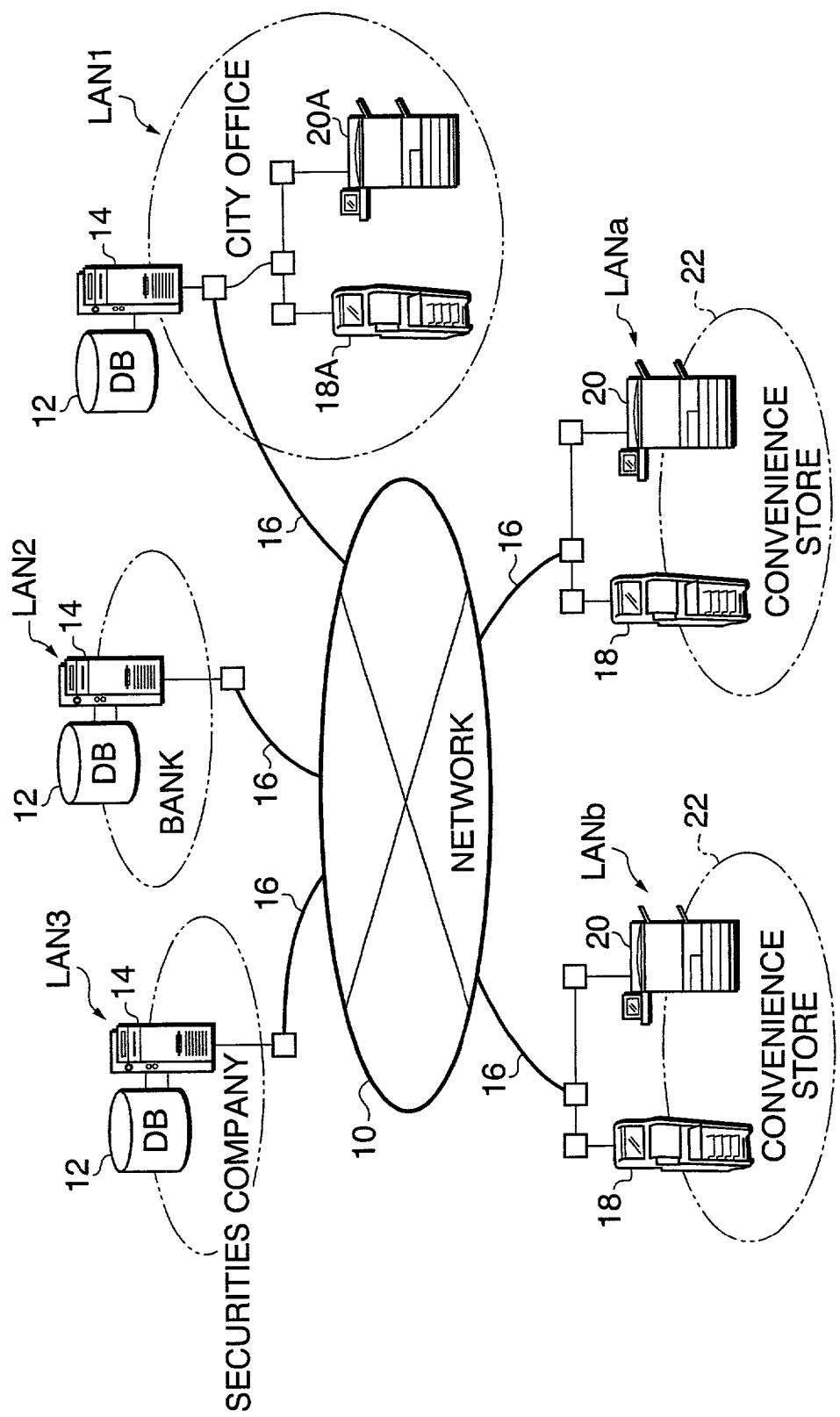
FIG. 1 is a conceptual diagram showing the configuration of a recording medium outputting system of a first embodiment.
Figure 2:
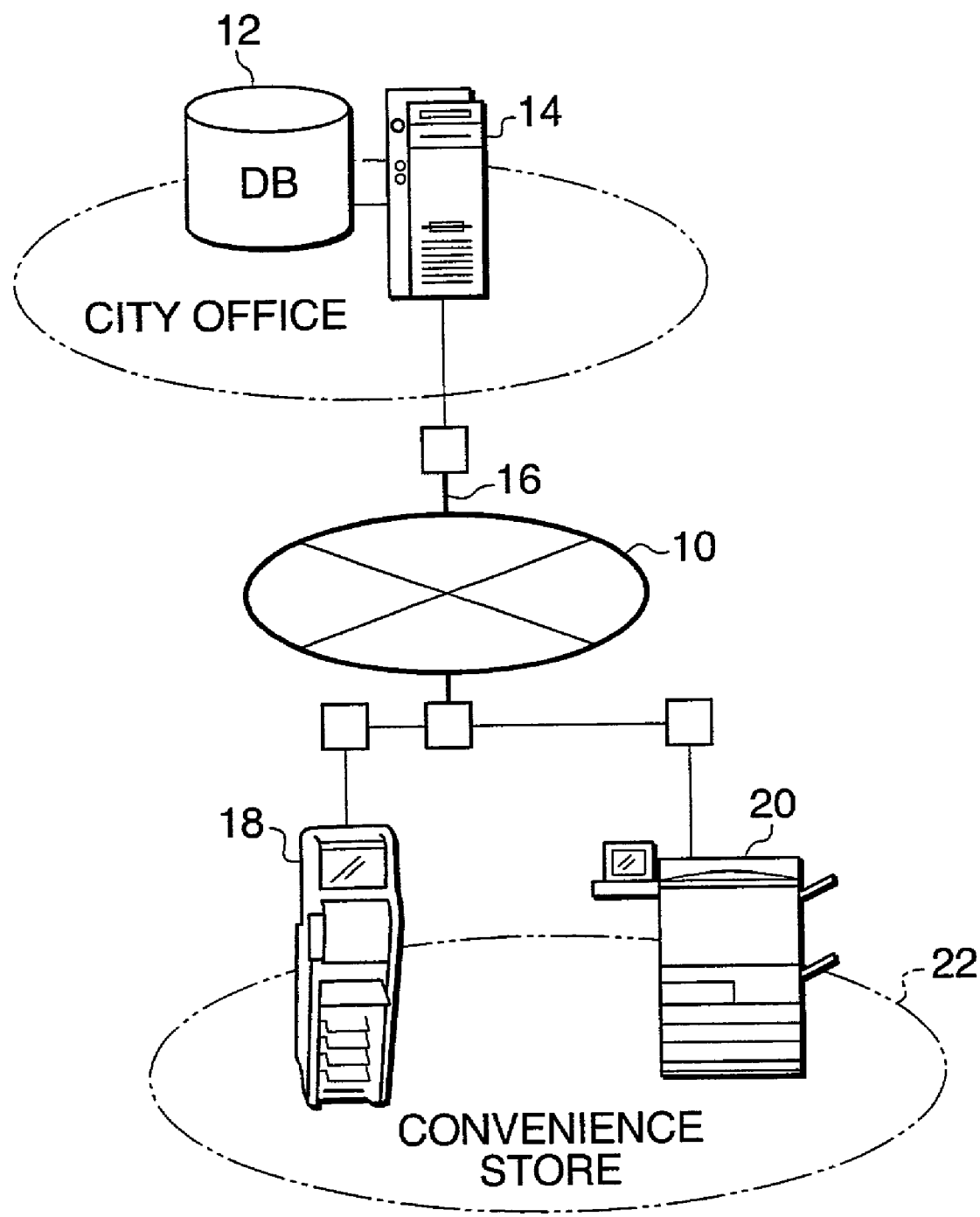
FIG. 2 is a conceptual diagram showing a partial configuration of the recording medium outputting system of the first embodiment.

As shown in FIGS. 1 and 2, the recording medium outputting system is constructed by connecting a LAN 1 having a database server (DB server) 14 for managing transmission/reception of data to/from a database 12 disposed in a government and municipal office such as a city office and a number of local area networks LANa, LANb, . . . via communication lines 16 such as telephone lines and the Internet 10. The LANs LANa, LANb, are provided in stores 22 such as convenience stores or post offices characterized by its larger number of stores, each having a terminal 18 for designating a document to be outputted, and a printer 20 for outputting the designated document. The terminal 18 and printer 20 installed in each of the stores 22 may be directly connected to the Internet 10 without constructing the LAN. The LAN1 having the DB server 14 and a large number of LANa, LANb, and so forth may be connected over other networks and private lines.

The terminals 18 include CPU, memory, an input-output device such as a touch panel, etc., an IC card slot for reading an IC card, and the like. The printers 20 are not limited to an identical model, and may include plural models different in output characteristics such as resolution, the number of colors, tone, and the like.

To the LAN 1 disposed in a municipal office such as a city office, a terminal 18A and a printer 20A having configurations similar to the terminal and printer installed in each of the stores 22 are connected. LAN 2, LAN 3, . . . installed in companies such as employee-leasing company, bank, securities company, and nonlife insurance company which manage secret documents by key databases 12 are also connected to the Internet 10.

As shown in FIG. 3, the DB server 14 to which the database 12 is connected has a transmitting/receiving unit 24 for transmitting/receiving data, a merging unit 26 for merging copy forgery preventing image data for preventing forgery by copying (latent-image-buried image data in the embodiment) and document data retrieved from the database 12, and a control unit 28 for controlling the units. The elements are connected to each other via a bus.

The database 12 managed by the DB server 14 contains document data of resident basis ledgers, seal register original registers, and family register original registers (not shown) of municipalities across the country, and further, as shown in FIG. 4, a table of different latent-image-buried image data LABGPR1, LABGPR2, LABGPR3, and so forth prepared in advanced according to name of municipalities, kind of certificates, and printer property, according to IP (Internet Protocol) addresses of printers 20 respectively installed in the stores 22.

Different latent-image-buried image data LABG1, LABG2, LABG3, . . . is prepared for various document data as forgery prevention target image data of municipalities which provide the document data, and made different in the number of colors, resolution, and tone property, according to printer characteristics. The latent-image-buried image data may be varied in accordance with only the municipalities or document data.

Since image forming characteristics are usually different for different models, different latent-image-buried image data is provided for different models. For example, as shown in FIG. 4, where certificate of residences issued by the Adachi Ward Office in Tokyo are outputted to printers 20 having an address of IP1 placed in convenience stores, the certificate of residences are associated with latent-image-buried image data LABGPR1; where certificate of residences issued by the Adachi Ward Office in Tokyo are outputted to a printer 20 of the same model (same characteristics) having an address of IP25 placed in the city office, the certificate of residences can be associated with the same latent-image-buried image data LABGPR1.

In this embodiment, the property information (printer resolution, tone property, and the number of colors) of printers capable of outputting documents specified in the terminals 18 is obtained in advance, and latentimage-buried image data corresponding to the property information of the printers 20 is stored in a database in the form of table, in correspondence with IP addresses. By this arrangement, by specifying the IP address of the printers 20, latent-image-buried image data corresponding to the characteristics of the printers can be selected. Alternatively, when the DB servers 14 inquires of the printers 20 the status thereof, the property information of the printers 20 may have been passed in advance to the DB servers 14 from the printers 20.

A latent-image-buried image will now be described. FIGS. 5A to 5F are diagrams showing an example of the latent-image-buried image. FIG. 5A shows the whole latent-image-buried image. The area of letters "COPY" in black in FIG. 5A corresponds to a latent image portion which is visualized when it is copied by a copier. The area surrounding the latent image portion is a background portion which is not visualized when it is copied. Since the latent image portion and the background portion are formed by using the same single color ink so that apparent colors and densities are the same, it is difficult to discriminate the letters "COPY" in the latent image portion in practice. When the latent-image-buried image is copied by a copier, however, the characters "COPY" appear on a copy as shown in FIG. 5B. FIG. 5C shows an enlarged image of a square area in FIG. 5A. The latent-image-buried image is constructed of fine white and black pixels. The latent image portion is constructed by arranging relatively large dots relatively non-densely, and the background portion is constructed by arranging relatively small dots relatively densely. FIG. 5D shows the enlarged image of FIG. 5C in the form of binary data.

When the original recording medium such as a sheet of paper on which the latent-image-buried image is recorded is copied, the dots constructing the latent image portion are copied with fidelity since they have the size and density resolved by a copier. However, the dots constructing the background portion are not copied since they have the size which cannot be resolved by the copier. Consequently, only the latent image pattern buried in the latent-image-buried image appears on a copy. By using this technique, when letters of warning such as "copy inhibited" are buried as a latent image in the latent-image-buried image, the letters of warning such as "copy inhibited" appear clearly on a copy. Consequently, illegal copying can be suppressed, and the original and a copy can be discriminated from each other.

In this embodiment, latent-image-buried image data is generated so as to have the same resolution as the output resolution of a corresponding printer, and gray-scale corrected so that the latent image parts and background part of a latent-image-buried image are almost equal in reproduction density, on paper when printed by the corresponding printer. If the corresponding printer is a monochrome printer, the latent-image-buried image data is generated as black and white binary image data; if a color printer, it is generated as color image data of four colors YMCK (yellow, magenta, cyan and black).

For example, where an output printer is a color printer A having a resolution of 600 dpi, latent-image-buried image data is generated as color image data having a resolution of 600 dpi and gray-scale corrected in the four colors YMCK for use with the color printer A. Where an output printer is a color printer B having a resolution of 600 dpi, latent-image-buried image data is generated as color image data having a resolution of 600 dpi and gray-scale corrected in the four colors YMCK for use with the color printer B. Where an output printer is a monochrome printer C having a resolution of 1200 dpi, latent-image-buried image data is generated as black and white binary data having a resolution of 1200 dpi and gray-scale corrected for use with the monochrome printer C.

As shown in FIG. 5E, fine patterns called camouflage patterns can be formed in the entire background portion of a latent-image-buried image. The camouflage pattern has a density lower than the other area. When the camouflage pattern is copied by a copier, it does not appear on a copy. As shown in FIG. 5F, a symbol mark of a municipality such as a mark of a city may be buried as a mask image in the latent-image-buried image. In FIG. 5F, a star-shaped figure is expressed as an example of the mark. Fine elements constructing the background image or mask image are not limited to dots but may be line screens.

Figure 6:
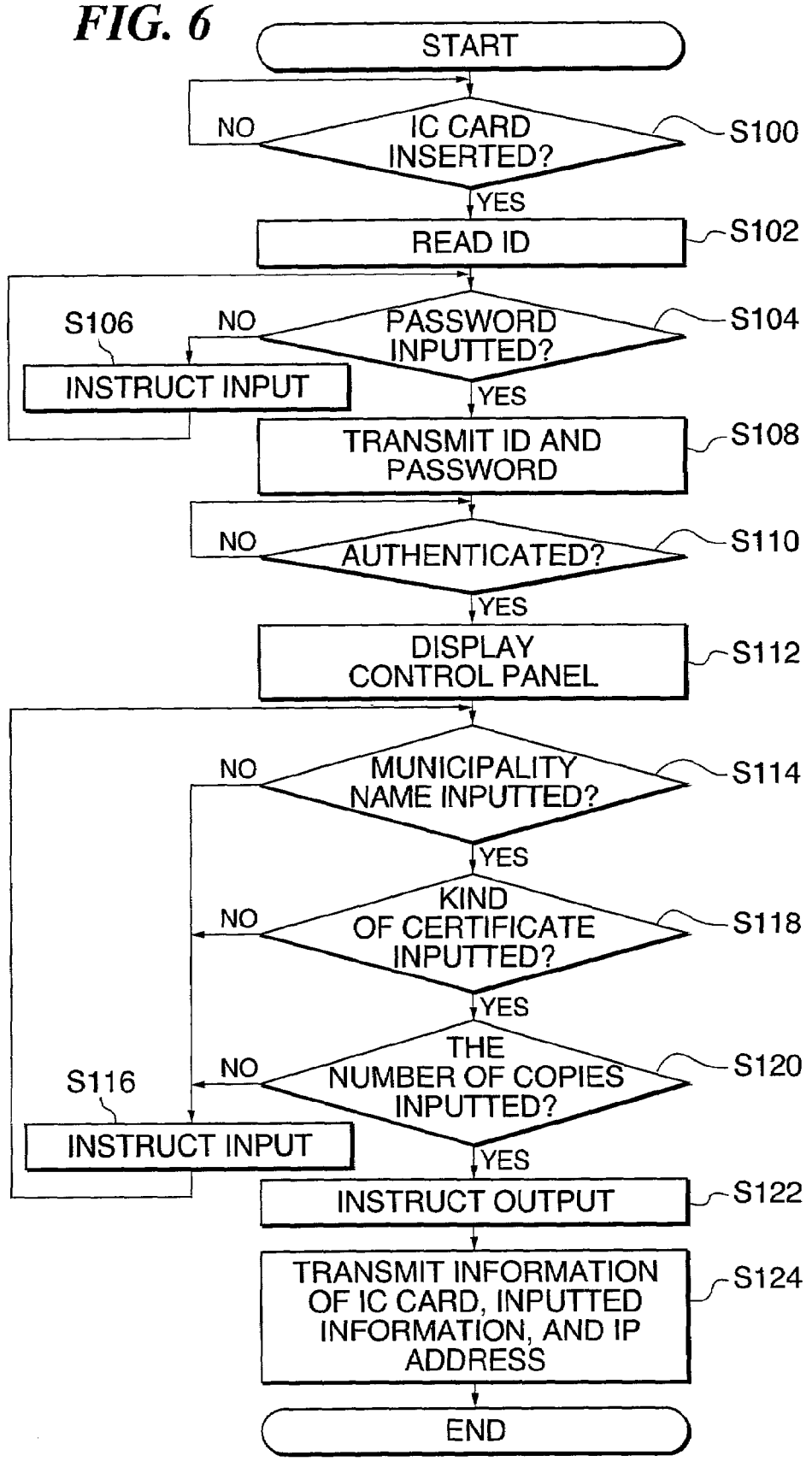
FIG. 6 is a flowchart showing the processing operation of a terminal of the first embodiment.

Referring to the flowchart of FIG. 6, the processing operation of the terminal 18 installed in the store 22 will now be described. An IC card in which information such as ID number and address is stored is distributed in advance from the municipality to the user. After the user inserts his/her IC card into the IC card slot formed in the terminal 18 and the insertion of the IC card is recognized in step 100, the information such as the ID number recorded on the inserted IC card is read in step 102. When the user operates the touch panel of the terminal 18 to input the password, the entry of the password is recognized in step 104. In step 108, the read ID number and the inputted password are sent as authentication information by which access is permitted to the DB server 14. When the password is not inputted, in step 106, the user is instructed to input the password by sound or display on the touch panel.

In step 110, whether the user is authenticated to obtain access by the DB server 14 or not is determined. When YES, in step 112, a control panel for selecting municipality name, the kind of a certificate (for example, certificate of residence, document certifying that a seal is registered, or copy of one's family register) and the number of necessary copies of the certificate is displayed on the touch panel.

The user operates the touch panel on which the control panel is displayed to select the municipality name (for example, "Adachi Ward Office"), the kind of a certificate (for example "certificate of residence"), and the number of necessary copies (for example, "1"), and selects "output", thereby giving a certificate output instruction. In the above steps 114 to 120, whether the municipality name is inputted or not, the kind of the certificate is inputted or not, and the number of necessary copies is inputted or not are sequentially determined. When any of them is not inputted, an instruction is given to the user to input the information in step 116. In such a manner, the entry of the information necessary to instruct an output is completed. When "output" is selected in step 112, the information read from the IC card, information inputted from the touch panel, and an IP address of the printer 20 as an output destination are transmitted to the DB server 14 together with time/day/month/year of acceptance as necessary. It is also possible to selectively instruct "on-line output" and "off-line output".

The information read from the IC card corresponds to information regarding the operator of the terminal. The IP address of the printer corresponds to information regarding an output terminal (output location) of the recording medium. The time/day/month/year of receipt of a job corresponds to information regarding a timing of outputting a recording medium. Since a job is received and outputted almost simultaneously, the time/day/month/year of reception may be used as information regarding the timing of outputting a recording medium.

The processing operation of the DB server 14 will now be described by referring to the flowchart of FIG. 7. When it is determined in step 200 that the information read from the IC card of the user, information inputted from the touch panel, and the IP address which are sent from the terminal 18 are received by the transmitting/receiving unit 24, in step 202, on the basis of the received information, the document data of the certificate instructed to be outputted is retrieved from the database 12. For example, when the certificate instructed to be outputted by the user is "certificate of residence", the basic residence register of the selected municipality is searched. When the document instructed to be outputted by the user is "document certifying that a seal is registered", the original seal register of the selected municipality is searched.

In step 204, the retrieved document data is read and is converted to document image data described in the PDL (Printer Description Language) (hereinbelow, also called PDL data) by using a printer driver installed in the DB server 14.

Figure 8:
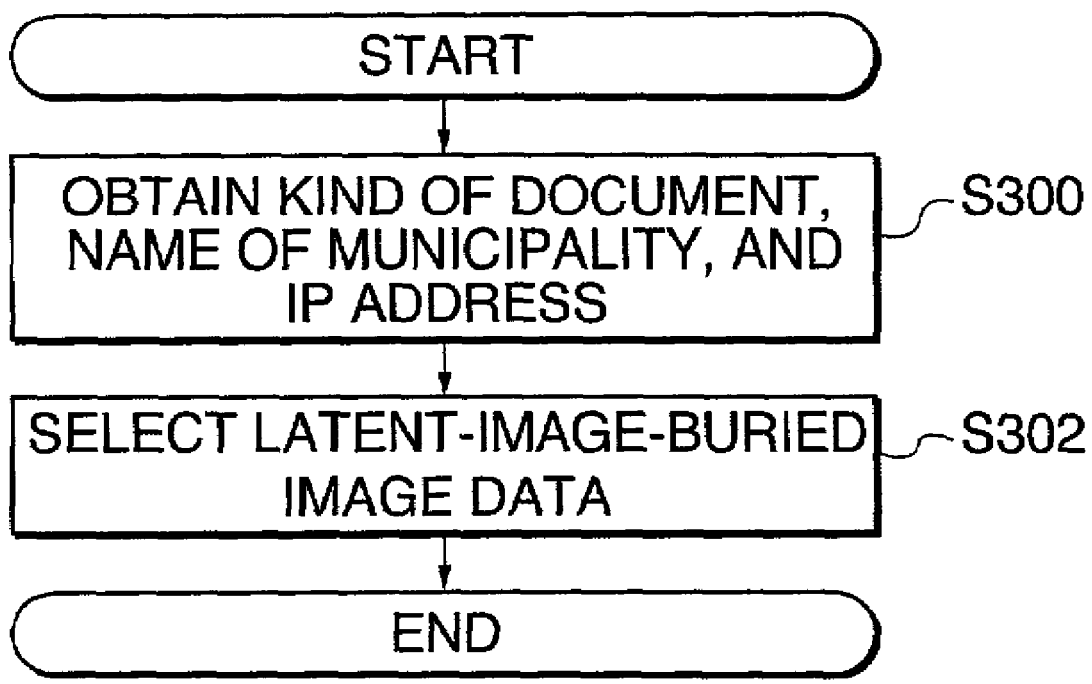
FIG. 8 is a flowchart showing an interrupt routine for determining latent-image-buried image data of the first embodiment.

In step 206, as shown in FIG. 8, the latent-image-buried image data to be merged is determined. Namely, in step 300, a kind of certificate, a name of municipality, and a printer IP address are obtained, and in step 302, using the table shown in FIG. 4, latent-image-buried image data corresponding to the kind of certificate, name of municipality, and IP address is selected.

After the latent-image-buried image data is determined, in step 208, a merge between the document image data and the latent-image-buried image data is instructed to the merging unit 26. The merging unit 26 does not merge the latent-image-buried image data directly with the document image data by an imaging process but analyzes the PDL data generated in step 204 and inserts a command for merging the selected latent-image-buried image data in a predetermined position in the PDL data and the latent-image-buried image data. By the operation, the latent-image-buried image data inserted to the PDL data in the printer 20 is merged with the document image data. After that, the PDL data in which the command and the latent-image-buried image data are inserted is controlled to be transferred to the transmitting/receiving unit 24 in step 210, and sent from the transmitting/receiving unit 24 to the printer 20 specified by the IP address in step 212.

Figure 9:
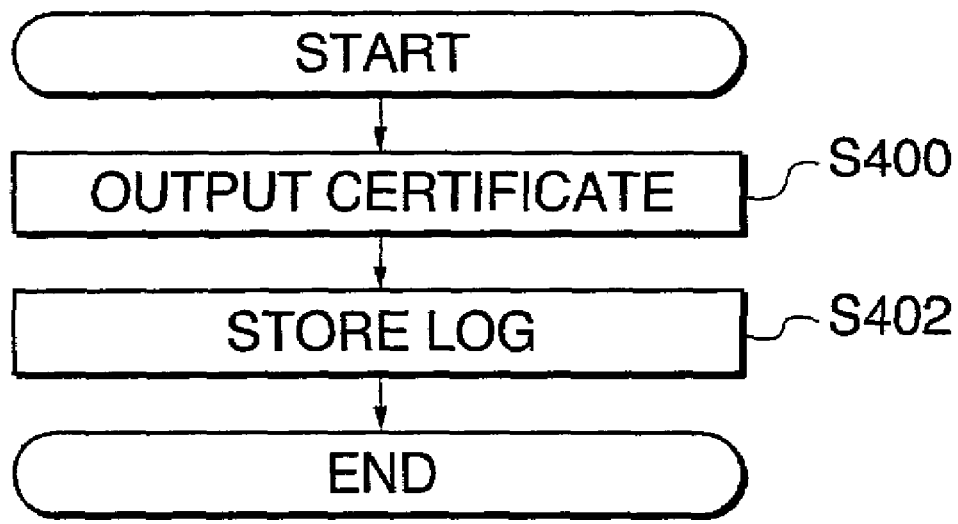
FIG. 9 is a flowchart showing the processing operation of a printer.

On receipt of the data from the DB server 14, as shown in FIG. 9, the printer 20 outputs a document to which the latent-image-buried image is added on the basis of the merged data transmitted from the DB server 14 in step 400. In step 402, a log (print history such as output document data, output time, and destination) is stored by using a log managing function of the printer 20. In such a manner, a sheet of paper (certificate) on which an image obtained by merging the document image and the latent-image-buried image is printed is outputted from the printer 20.

In the embodiment, in the DB server, merged data is generated by merging the document data of the secret document read from the database of the city office with the latent-image-buried image. The merged data is transmitted to the printer as a destination, and the image based on the merged data is outputted. Thus, a secret document to which the copy forgery preventing image is added can be outputted without using the copy forgery preventing sheet. Also, since latent-image-buried image data having resolution, the number of colors, and tone property corresponding to the characteristics of a printer to output to is selected, satisfactory output images can be obtained regardless of the characteristics of printers.

Since the latent-image-buried image data is preliminarily generated and stored in the database and is selected and merged with document data, just a short time is required to output a secret document from the printer. Further, since various latent-image-buried image data is prepared according to the kinds of certificate and the municipality names, the kind of the certificate and the name of the municipality issuing the certificate can be easily determined.

Second Embodiment

A second embodiment of the invention will now be described. In the embodiment, in order to generate the above-described latent-image-buried image data each time a job is received, background image data and mask image data from which the latent-image-buried image data is generated is stored in the database 12.

Since the second embodiment is similar to the first embodiment, a description of the same components as those in the first embodiment will not be repeated and the different point will be mainly described. First, in the database 12, as shown in FIG. 10, background image data BG1, BG2, . . . and mask image data LA1, LA2, LA3, . . . are stored in a table by the names of municipalities and the kinds of certificates. In the second embodiment, the background image data and the mask image data from which the latent-image-buried image data in the first embodiment is generated are separately stored.

Figure 11:
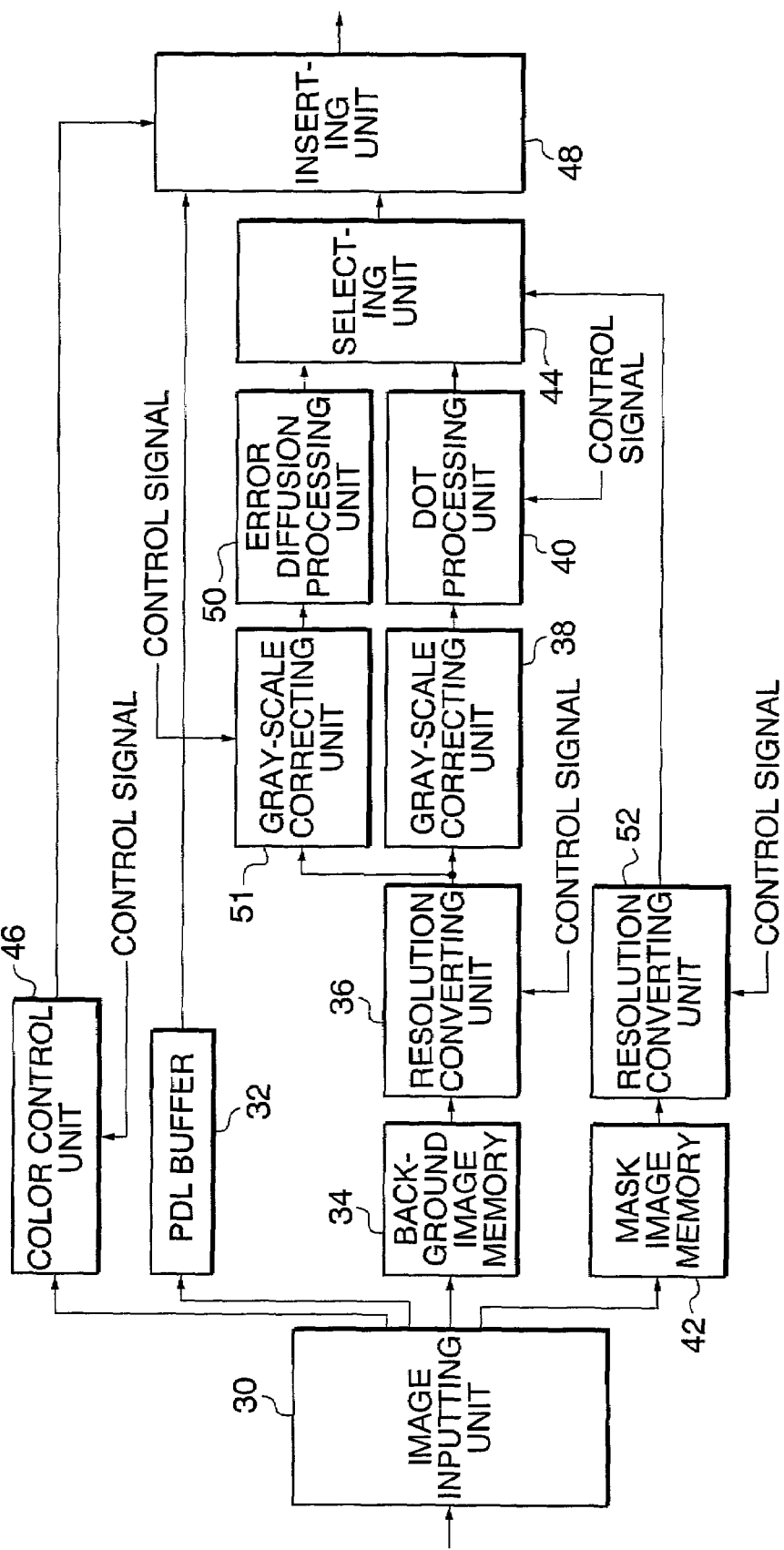
FIG. 11 is a block diagram showing the configuration of a merging unit of the database server of the recording medium outputting system according to a second embodiment.

The merging unit 26 in the second embodiment has, as shown in FIG. 11, an image inputting unit 30, a PDL buffer 32, a background image memory 34, resolution converting units 36 and 52, gray-scale correcting units 38 and 51, a dot processing unit 40, a mask image memory 42, a selecting unit 44, a color control unit 46, an inserting unit 48, and an error diffusion processing unit 50.

The image inputting unit 30 receives PDL data of document data as a main image recorded on the background (for example, data of a certificate of residence, a document certifying that a seal is registered, or a copy of family register), background image data, mask image data buried as a latent image in the background image, and color information of a color of the background image and the like. The PDL buffer 32 temporarily stores the document image data described in the PDL as a main image. The background image memory 34 temporarily stores the background image. The mask image memory 42 temporarily stores a mask image. The background image and the mask image may be of a resolution lower than that of an image to be outputted.

Control unit 28 of a DB server 14 sets printer property information (output resolution, tone property, and the number of colors) corresponding to an inputted IP address in the resolution converting units 36 and 52, the gray-scale correction units 38 and 51 and the color control unit 46.

The resolution converting unit 36 converts the resolution of a background image read from the background image memory 34 into an output resolution set by the control unit 28. The gray-scale correcting unit 38 performs gray-scale correcting process for the background image subjected to resolution conversion by the resolution converting unit 36 so as to meet the tone property set in advance by the control unit 28 so that the background image subjected to dot processing in the next dot processing unit 40 and the original background image are reproduced on paper in almost equal density. The gray-scale correcting unit 38 may perform conversion processing by configuring, e.g., LUT, or using proper functions. The dot processing unit 40 performs dot processing for the background image subjected to tone correction in the gray-scale correcting unit 38, in a smaller output line count than an output line count.

The gray-scale correcting unit 51 performs gray-scale correction on the background image data of which resolution has been converted by the resolution converting unit 36 so that density of a background image to be subjected to an error diffusion process by the error diffusion processing unit 50 at the post stage and that of the background image subjected to the dotting process, reproduced on a sheet are almost equal to each other. The error diffusion processing unit 50 carries out an error diffusion process on the background image of which gray-scale has been corrected by the gray-scale correcting unit 51.

The resolution converting unit 52 converts the resolution of the mask image stored in the mask image memory 42 into the output resolution.

The selecting unit 44 selects either the background image subjected to the dotting process by the dot processing unit 40 or the background image which is not subjected to the dotting process in accordance with the value of a pixel in the mask image of which resolution has been converted by the resolution converting unit 52 and outputs the selected image. By the operation, the mask image can be buried as a latent image in the background image. An image to be outputted will be called a latent-image-buried image.

The color control unit 46 designates a color component for a merge from the number of colors set in advance by the control unit 28. The inserting unit 48 analyzes the PDL data read from the PDL buffer 32 and inserts the command of merging the latent-image-buried image data in a predetermined position of the PDL data and the latent-image-buried image data.

The processing operation of the DB server 14 will now be described. The processing operation of the DB server 14 in the embodiment is the same as that of the DB server 14 in the first embodiment shown in FIG. 7 except for step 206 where the process of determining the latent-image-buried image data is performed, so that a description on the same part will not be repeated.

Figure 12:
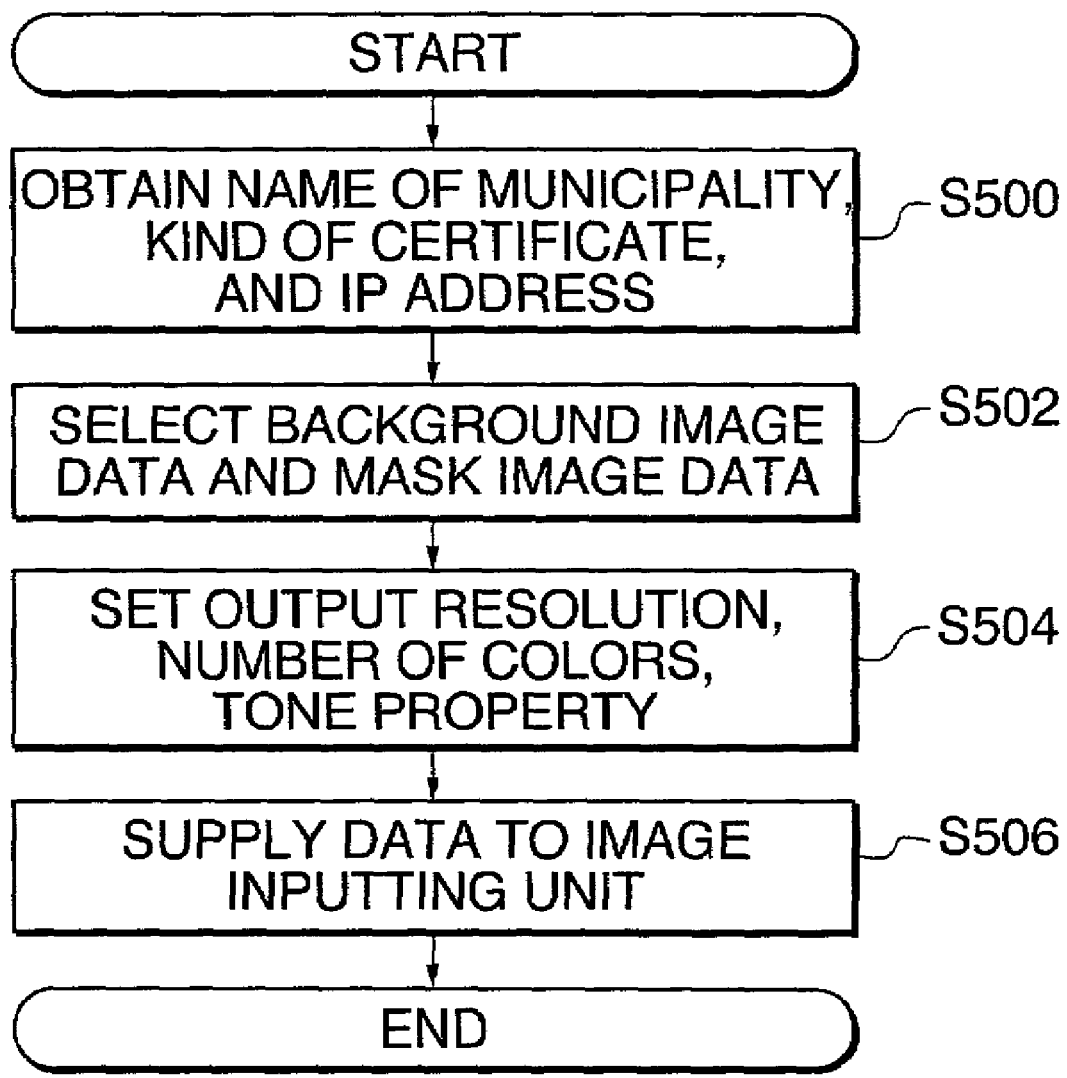
FIG. 12 is a flowchart showing the interrupt routine for determining latent-image-buried image data of the second embodiment.

As shown in FIG. 12, processing for determining latent-image-buried image data in this embodiment is performed as follows. In step 500, data of certificate, name of municipality, and printer IP address is obtained; in step 502, using the table shown in FIG. 10, background image data and mask image data corresponding to the kind of certificate and name of municipality are selected; in step 504, by the control unit 28, printer property information corresponding to the IP address is set in the resolution converting units 36 and 52, the gray-scale correcting units 38 and 51, and the color control part 46, respectively; and in step 506, the background image data and the mask image data selected previously are inputted to the image inputting unit 30 of the merging unit 26.

The background image data and the mask image data supplied to the image inputting unit 30 are stored into the background image memory 34 and the mask image memory 42, respectively. The PDL data supplied to the image inputting unit 30 is stored into the PDL buffer 32. After the PDL data is stored into the PDL buffer 32, the process of generating the latent-image-buried image data and inserting the latent-image-buried image data into the PDL data starts.

First, the background image is read from the background image memory 34. The resolution of the read background image is converted to the output resolution by the resolution converting unit 36. The background image which has been subjected to the resolution conversion is outputted to the gray-scale correcting units 38 and 51.

In the gray-scale correcting unit 38, the gray-scale correcting process is performed on the supplied background image. The gray-scale correcting process is performed to correct a change in the gray-scale characteristic in the dot processing unit 40 at the post stage. The gray-scale-corrected background image is subjected to the dotting process with the number of lines smaller than the number of output lines in the dot processing unit 40. For example, the background image can be converted by, for example, organized dithering to a dotted image having gray-scale levels 0 or 255 and the number of dot lines of 50. The dotted background image is outputted to the selecting unit 44.

In the gray-scale correcting unit 51, the gray-scale correcting process is performed on the supplied background image. The gray-scale correcting process is performed to correct a change in the gray-scale characteristic in the error diffusion processing unit 50 at the post stage. The gray-scale-corrected background image is subjected to the error diffusion process in the error diffusion processing unit 50. The background image subjected to the error diffusion is outputted to the selecting unit 44.

In parallel with the processes on the background image, a process on the mask image is performed. A mask image is read from the mask image memory 42 and is converted to have the output resolution by the resolution converting unit 52. The mask image subjected to the resolution conversion is supplied as a selection signal to the selecting unit 44.

When the pixel value in the mask image as a selection signal is, for example, "1" (black pixel), the selecting unit 44 selects and outputs the pixel value of the dotted background image. When the pixel value is "0" (white pixel), the selecting unit 44 selects the pixel value of the background image subjected to the error diffusion. In the example shown in FIG. 5, the letter pattern of "COPY" or the like is drawn in the mask image. Consequently, as an image outputted from the selecting unit 44, the dotted background image is selected for the area corresponding to the letter pattern of "COPY" or the like in the background image data, and the other area is made by error-diffused isolated dots. An output of the selecting unit 44 is latentimage-buried image data. The latent-image-buried image data is outputted to the inserting unit 48.

The inserting unit 48 reads out the PDL data from the PDL buffer 32, analyzes the PDL data, and inserts the command of merging the selected latent-image-buried image data and the latent-image-buried image data into a predetermined position in the PDL data. The command of merging the latent-image-buried image data can designate a color component for a merge. As the merge color component, one or more of four colors of YMCK as developing colors of the printer can be designated. The color is designated by color control information set in the color control unit 46.

For example, in the case of designating a C component as the merge color component, when the PDL data received is developed to a raster in the printer 20, the inserted latent-image-buried image data is merged with only the C component, and the resultant data is printed. That is, a background pattern in cyan color (light blue) is merged with the background. By designating YMC as merge color components and inserting the latent-image-buried image data of YMC planes, a latent-image-buried image in an arbitrary color can be formed. The PDL data in which the latent-image-buried image data is inserted is controlled to be transferred to the transmitting/receiving unit 24 and finally transmitted to the printer 20 specified by the IP address.

In the embodiment, in the DB server, merged data is generated by merging the document data of a secret document read from the database of the city office and the latent-image-buried image data and transmitted to the printer as a destination, and an image based on the merged data is outputted. Consequently, the secret document to which the copy forgery preventing image is added can be outputted without using the copy forgery preventing sheet. Also, since latent-image-buried image data corresponding to the characteristics of a printer to output to is generated, satisfactory output images can be obtained regardless of the characteristics of printers.

Since the different latent-image-buried image data is prepared according to the kinds of certificates and the municipality names, the kind of the certificate and the name of the municipality issuing the certificate can be easily determined.

Although the case where the document image data is a monochrome image and the case where the document image data is a color image have been described above, for example, according to the kind of a certificate, the merged data may be generated while changing the color of either the background image or mask image. In this case as well, the document image, background image, and mask image are merged in an arbitrary color as described above.

In the configuration of FIG. 11, in order to further reduce the memory capacity, a background image and a mask image of low resolution can be compressed and stored. In this case, reversible compression such as MMR or JBIG can be used for the mask image and, irreversible compression such as JPEG can be used for the background image. Obviously, the compressing method and the like are arbitrary.

Third Embodiment

A third embodiment of the invention will now be described. In the embodiment, on the assumption that output is made from a color printer, the color of the latent-image-buried image described above is changed according to time/day/month/year of reception of a job.

Since the third embodiment is similar to the second embodiment, a description of the same part as that in the second embodiment will not be repeated and the different point will be mainly described. First, in the database 12, as described in the second embodiment, the background image data of different kinds and the mask image data are stored in a table by the municipalities and the kinds of certificates. Each of the background image data and the mask image data is of a single color.

Figure 7:
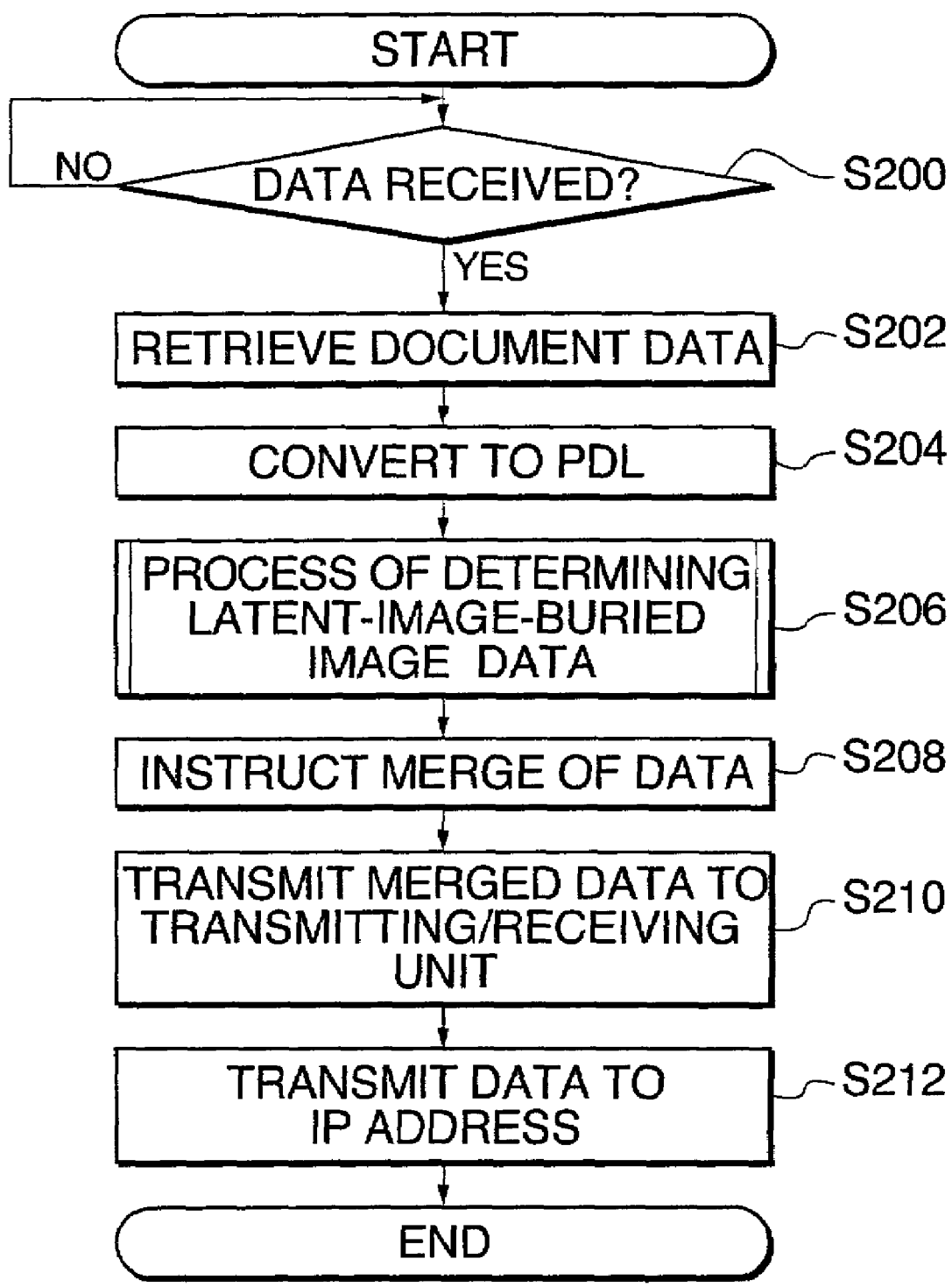
FIG. 7 is a flowchart showing the processing operation of the database server of the first embodiment.

The processing operation of the DB server 14 is the same as that of the DB server 14 in the first embodiment shown in FIG. 7 except for step 206 where the process of determining the latent-image-buried image data is performed. A description of the same part will not be repeated. The processing operation is performed only when a color printer is determined from an IP address.

Figure 13:
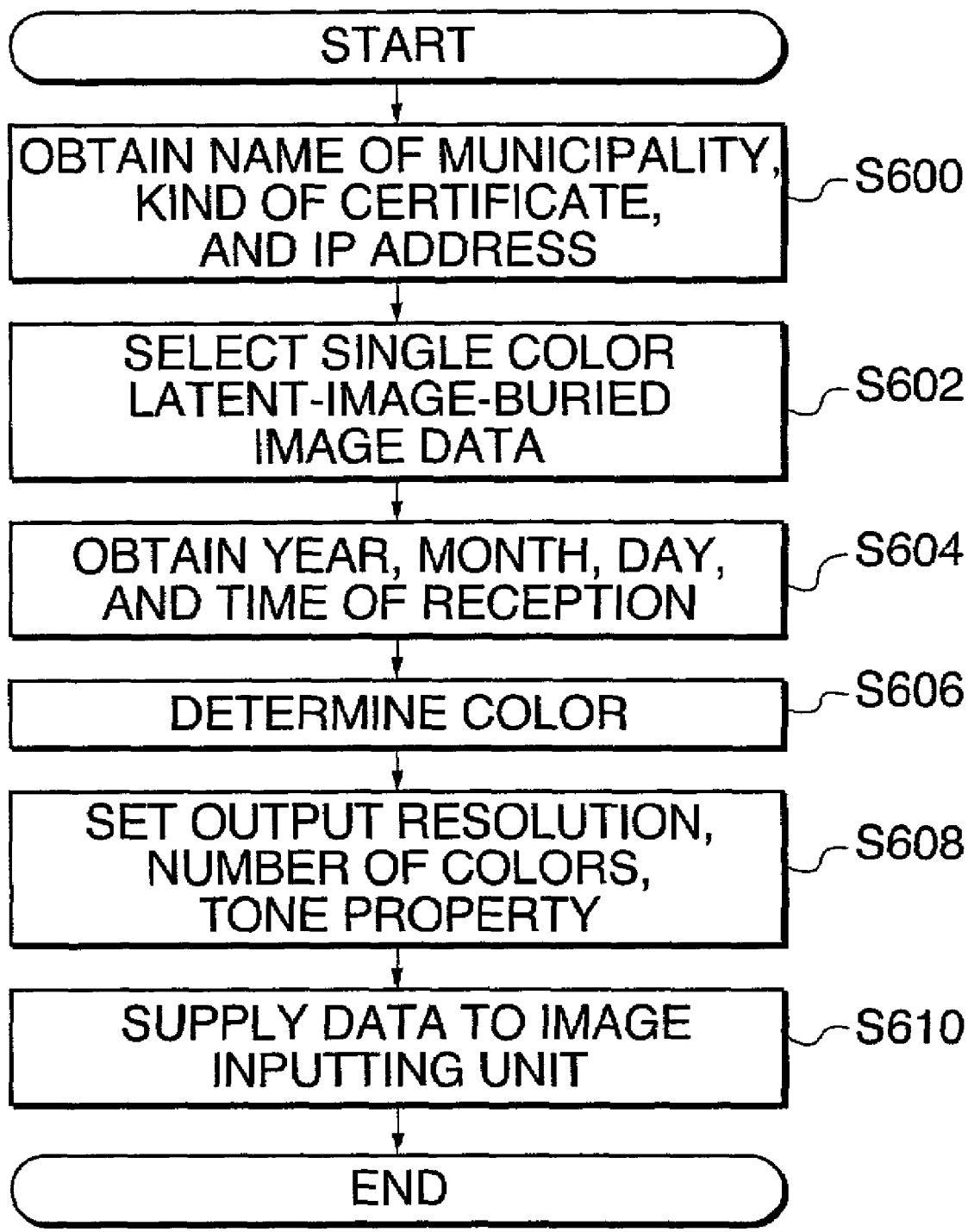
FIG. 13 is a flowchart showing the interrupt routine for determining latent-image-buried image data of a third embodiment.

As shown in FIG. 13, in the process of determining the latent-image-buried image data, in step 600, data of the kind of a certificate and the name of the municipality is obtained. In step 602, background image data and mask image data corresponding to the data of the kind of the certificate and the name of the municipality are selected by using the table shown in FIG. 10. In step 604, time/day/month/year of reception of a job is obtained. In step 606, the color of the background image and the mask image is determined according to the time/day/month/year of the reception. For example, the M color is determined for the period from January to March and the C color is determined for the period from April to June. The time/day/month/year of the reception of a job may be inputted from the terminal 18 or generated by the DB server on receipt of an output instruction. After the background image data and the mask image data are selected and the color is determined. In step 608, by the control unit 28, printer property information (herein, output resolution and tone property) corresponding to the IP address is set in the resolution converting units 36 and 52, and the gray-scale correcting units 38 and 51, respectively. In step 610, the background image data and the color data selected previously are inputted to the image inputting unit 30 of the merging unit 26. Since the color data is inputted to the inserting unit 48 via the color control unit 46 and specifies the color of the latent-image-buried image data, image data having the determined color information is generated.

In the embodiment, in the DB server, merged data is generated by merging document data of a secret document read from the database of a city office with latent-image-buried image data and is transmitted to the printer as a destination, and the image based on the merged data is outputted. Consequently, the secret document to which the copy forgery preventing image is added can be outputted without using the copy forgery preventing sheet. Also, since latent-image-buried image data corresponding to the characteristics of a printer to output to is generated, satisfactory output images can be obtained regardless of the characteristics of printers.

Since various latent-image-buried image data is used according to the kinds of certificates and the names of municipalities, the kind of the certificate and the name of the municipality can be easily determined.

Although different colors are used according to the time/day/month/year of reception of jobs in the above example, different colors may be used according to the kinds of certificates, municipalities, or the like. It is also possible to preliminarily determine time and day to change the color, for example, at midnight of the first day of every month and change the colors of all the stored latent-image-buried images.

Fourth Embodiment

A fourth embodiment of the invention will now be described. In the embodiment, a mask image is generated according to the ID number of the user, the IP address of a printer, and time/day/month/year of reception of a job transmitted from a terminal, and the above-described latent-image-buried image is generated by using the generated mask image.

Since the fourth embodiment is similar to the second embodiment, a description of the same part as that of the second embodiment will not be repeated and the different point will be mainly described. First, in the database 12, as shown in FIG. 20, various background image data is stored in a table by the names of municipalities and the kinds of certificates. In the fourth embodiment, a mask image is generated according to the ID number of the user or the like, a mask image is not prestored.

The processing operation of the DB server 14 is the same as that of the DB server 14 in the first embodiment shown in FIG. 7 except for step 206 where the process of determining the latent-image-buried image data is performed. A description of the same part will not be repeated.

Figure 14:
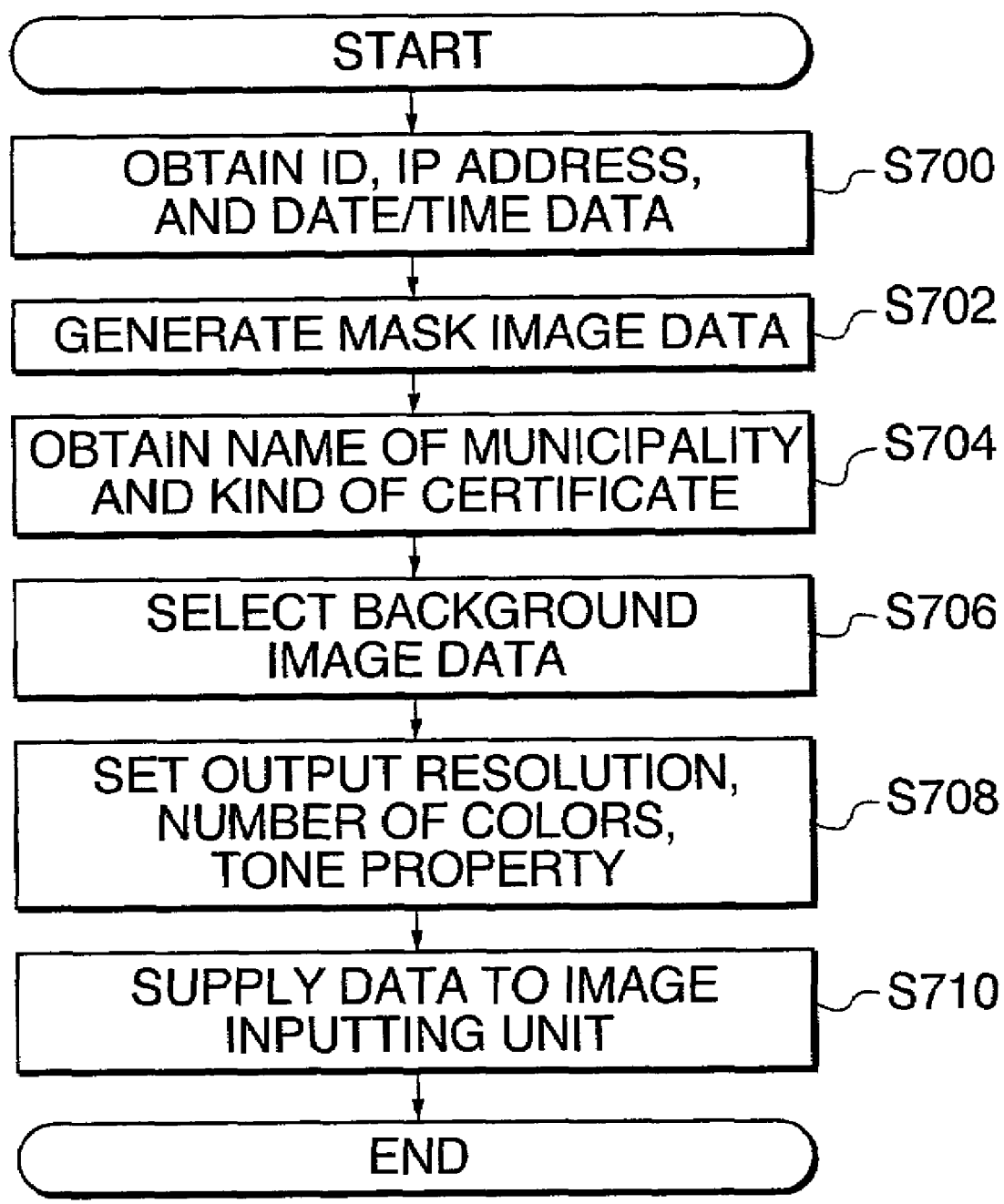
FIG. 14 is a flowchart showing the interrupt routine for determining latent-image-buried image data of a fourth embodiment.

As shown in FIG. 14, in the process of determining the latent-image-buried image data, in step 700, data of the ID number of the user, the IP address of a printer, and time/day/month/year of reception of a job is obtained. In step 702, the character strings are raster-developed to binary image data, thereby generating mask image data. In step 704, the kind of the certificate and the name of the municipality are obtained. In step 706, by using the table shown in FIG. 20, background image data corresponding to the kind of the certificate and the name of the municipality is selected. The mask image data is generated and the background image data is selected. In step 708, by the control unit 28, printer property information corresponding to the IP address is set in the resolution converting units 36 and 52, the gray-scale correcting units 38 and 51, and the color control unit 46, respectively. In step 710, the mask image data and the background image data selected previously are inputted to the image inputting unit 30 of the merging unit 26.

In the embodiment, in the DB server, merged data is generated by merging document data of a secret document read from the database of the city office with latent-image-buried image data and is transmitted to the printer as a destination, and the image based on the merged data is outputted. Consequently, the secret document to which the copy forgery preventing image is added can be outputted without using the copy forgery preventing sheet. Also, since latent-image-buried image data corresponding to the characteristics of a printer to output to is generated, satisfactory output images can be obtained regardless of the characteristics of printers.

The mask image is generated each time a print is outputted in accordance with the ID number of the user, time/day/month/year of reception of a job, and the IP address of the printer which are transmitted from a terminal. Consequently, the storage capacity of the database may be small. Since a different mask image is supplied for each print output and an image in which a different latent image pattern (character string of the ID number of the user or the like) is buried is printed, even when the document is copied illegally, the distribution path of the illegal copy can be traced. In the embodiment, the character string made by the ID number of the user, time/day/month/year of reception of a job, and the IP address of the printer is used as the latent image pattern. The certificate outputted by "whom", "when", and "where" can be known from the latent image pattern visualized by copying. It becomes especially easy to trace the distribution path of the illegal copy.

Since different background images are prepared according to the kinds of certificates and the names of municipalities to thereby provide different latent-image-buried image data, the kind of the certificate and the name of the municipality issuing the certificate can be easily determined.

In the fourth embodiment as well, as described in the foregoing embodiments, for example, the color of at least one of the background image and the mask image may be changed in accordance with the kind of a certificate or the like. Although the case where the background image data is prestored has been described above, in a manner similar to the mask image, the data may be generated by using the ID number, IP address, and the like.

Fifth Embodiment

A fifth embodiment of the invention will now be described with reference to FIG. 15. In the fifth embodiment, by using not the DB server disposed on the database side but a print server disposed on the LAN in the store where the terminal or printer is provided, the latent-image-buried image data and the document image data are merged.

Figure 15:
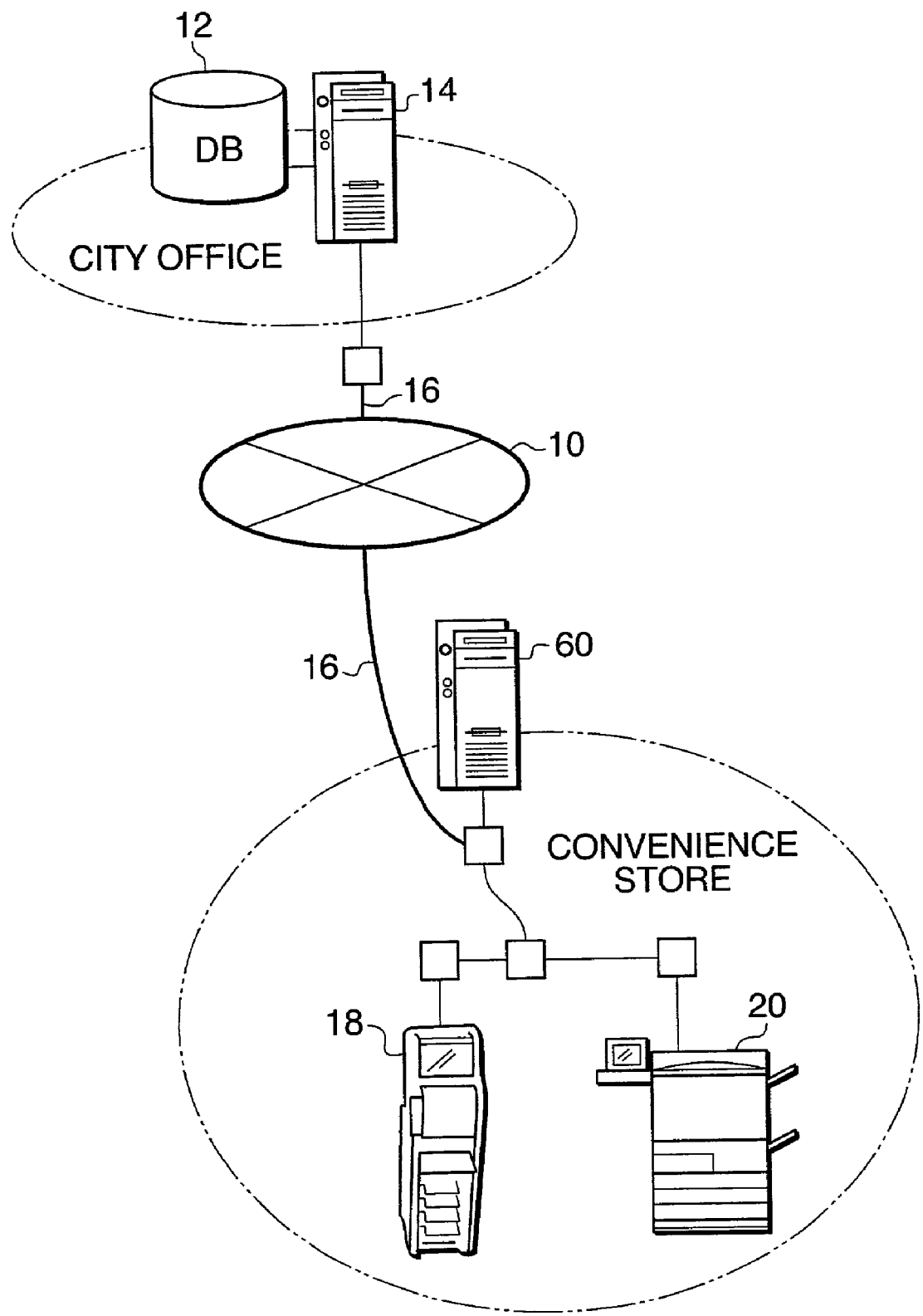
FIG. 15 is a conceptual diagram showing a partial configuration of the recording medium outputting system of a fifth embodiment.

As shown in FIG. 15, a recording medium outputting system is constructed by connecting a LAN having the DB server 14 for managing transmission/reception of data to/from the database 12 disposed in a municipality office such as a city office and a LAN having the terminal 18 for designating a document to be outputted or the like, the printer 20 for outputting the designated document, and a print server 60 which are installed in the store 22 such as convenience store or post office via the communication line 16 such as a telephone line and the Internet 10. Convenience stores and post offices are characterized by their large numbers. A number of LANs (not shown) are connected to the Internet 10.

Since the fifth embodiment is similar to the first embodiment, a description of the same part as that of the first embodiment will not be repeated and the different point will be mainly described. First, in the database 12, as shown in FIG. 21, only the number indicative of the kind of the latent-image-buried image (image number) is stored in a table in accordance with the name of the municipality and the kind of the certificate. In a manner similar to the DB server 14 shown in FIG. 3, the print server 60 has a transmitting/receiving unit, a merging unit, and a control unit. Further, the print server 60 has therein a memory in which the latent-image-buried image data is stored in a table in accordance with the same image number as that stored in the database 12 as shown in FIG. 22. It is also possible to provide a print server in the terminal 18 and not to provide the print server 60.

Figure 16:
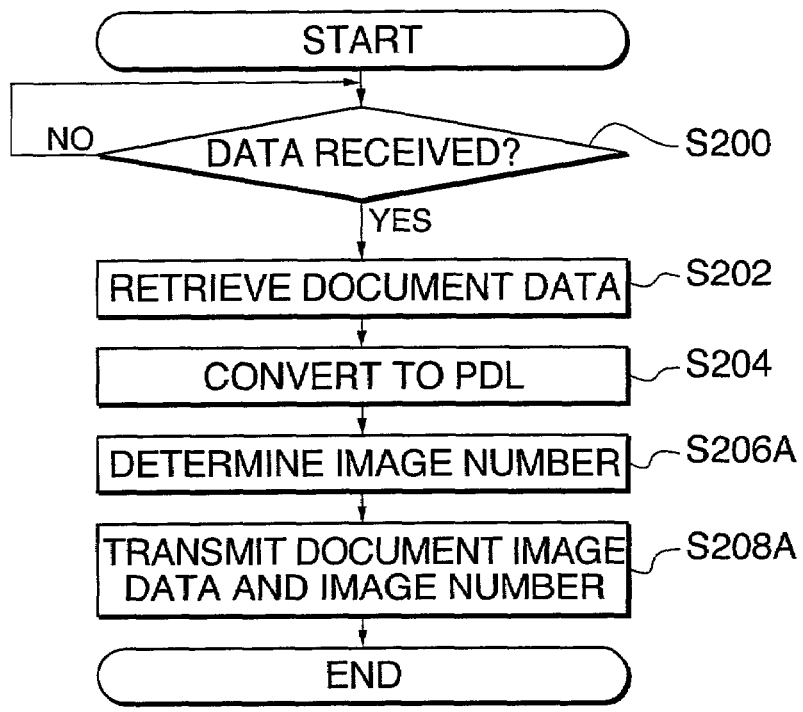
FIG. 16 is a flowchart showing the processing operation of the database server of the fifth embodiment.

By referring to the flowchart shown in FIG. 16, the processing operation of the DB server 14 will now be described. Since the processing operation of the DB server 14 in the fifth embodiment is partially overlapped with that of the DB server 14 in the first embodiment shown in FIG. 7, the same numbers are designated with respect to the same steps.

When it is determined in step 200 that information read from the IC card of the user, information inputted from the touch panel, and the IP address sent from the terminal 18 are received by the transmitting/receiving unit 24, document data of a certificate instructed to be outputted is retrieved from the database 12 on the basis of the received information in step 202. In step 204, the retrieved document data is read and converted to document image data described in the PDL by using the printer driver installed in the DB server 14.

In the next step 206A, the data of kind of certificate, name of municipality, and printer IP address is obtained, and using the table shown in FIG. 21, the image number of a latent-image-buried image corresponding to the kind of certificate, name of municipality, and printer IP address is determined. After the image number has been determined, in step 208A, the document image data coded in PDL and the image number are transmitted to the print server 60.

Figure 17:
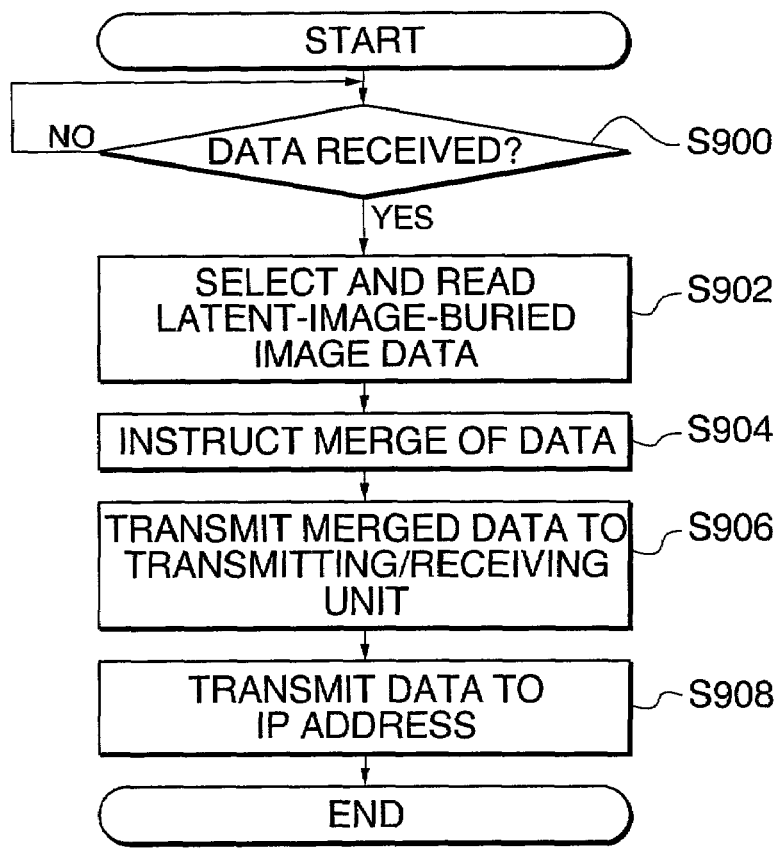
FIG. 17 is a flowchart showing the processing operation of a print server of the fifth embodiment.

With reference to the flowchart in FIG. 17, the processing operation of the print server 60 will now be described. When it is determined in step 900 that the document image data described in the PDL and the image number which are transmitted from the DB server 14 are received, in step 902, by using the table shown in FIG. 22, the latent-image-buried image data is selected on the basis of the transmitted image number and read from the memory. In step 904, a merge between the document image data and the selected latent-image-buried image data is instructed to the merging unit in the print server 60. In the merging unit, after merging the data, the merged data is sent to the transmitting/receiving unit in step 906. In step 908, the merged data is controlled to be transmitted from the transmitting/receiving unit in the print server 60 to the printer 20.

In the embodiment, in the print server, merged data is generated by merging document data of a secret document read from the database of the city office with latent-image-buried image data and is transmitted to the printer as a destination, and the image based on the merged data is outputted. Thus, the secret document to which the copy forgery preventing image is added can be outputted without using the copy forgery preventing sheet. Also, since latent-image-buried image data corresponding to the characteristics of a printer to output to is selected, satisfactory output images can be obtained regardless of the characteristics of printers.

Since the latent-image-buried image data is preliminarily generated and stored in the memory in the print server and is selected and merged with document data, just a short time is required to output a secret document from the printer. Particularly, in the embodiment, data transmitted from the database of the city office via the communication line and the Internet is only document data, a communication load is light, and the time required to output the document can be shortened.

Since various latent-image-buried image data is prepared according to the kinds of certificates and the municipality names, the kind of the certificate and the name of the municipality issuing the certificate can be easily determined.

Although the latent-image-buried image data preliminarily generated is stored in the memory of the print server, it is also possible to generate a mask image on the basis of the transmitted image number, or in a manner similar to the fourth embodiment, in accordance with the ID number of the user, the IP address of the printer, time/day/month/year of reception of a job, and the like transmitted from a terminal, and generate the latent-image-buried image data by using the generated mask image in the print server. In the case of generating the latent-image-buried image data in the print server, the merging unit in the print server has the configuration shown in FIG. 11.

In the foregoing first to fifth embodiments, as described hereinbelow, a certificate or the like can be outputted on condition that a charge is paid.

Figure 18:
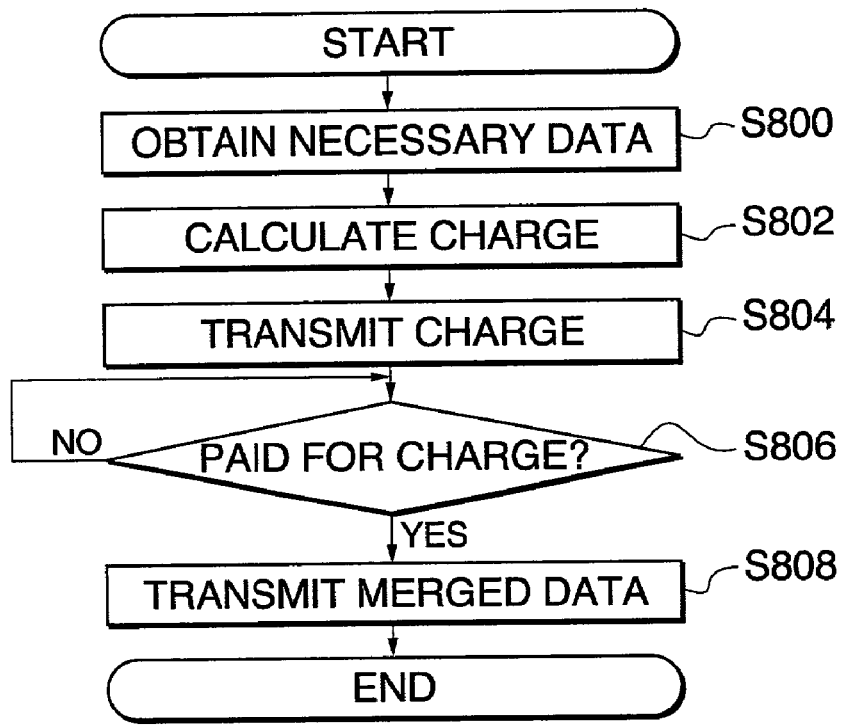
FIG. 18 is a flowchart showing the processing operation of a charging process.

In the first to fourth embodiments, as shown in FIG. 18, the DB server 14 captures data necessary for calculating a charge in step 800 and calculates the charge by, for example, referring to a preliminarily generated table in step 802. In step 804, the calculated charge data is transmitted to the terminal 18. When it is confirmed in step 806 that the charge has been paid, in step 808, document data (merged data) to which latent-image-buried image data is added is sent to the printer 20. Such a charging process can be performed in an arbitrary period since data indicative of the kind of a certificate is transmitted from the terminal 18 until merged data is transmitted. In the fifth embodiment, the print server 60 performs a similar processing operation.

The charge can be changed, for example, in consideration of use patterns of the user as described below. 1) Different charges are set for the user himself/herself and someone else (for example, his/her family member). 2) Different charges are set according to the kinds of certificates (for example, certificate of residence, copy of one's family register, document certifying that a seal is registered, and the like). 3) When an advertisement is placed on the document, the charge is reduced or waived. 4) Different charges are set according to issuing offices. 5) Different charges are set depending on whether or not an output position is in the jurisdiction (for example, in the city) of a municipality office (for example, out of the city). 6) Different charges are set according to the output positions such as the city office and stores such as a convenience store. 7) Different charges are set according to output time. For example, the charge is reduced or increased late at night.

The payment methods of the charge can be selected by the user from, for example, credit card, debit card, and cash by operating the touch panel of the terminal 18. When the user selects the payment by "cash", the user drops money in a slot provided in the terminal 18 or printer 20, thereby collecting the charge. When the user selects the payment by "credit card" or "debit card", the charge is withdrawn from the account of the user in a financial institution such as a bank by an on-line process.

Although the case where the charge is collected and then merged data is transmitted has been described above, it is also possible to collect the charge after merged data is transmitted. In this case, a slip is outputted from the printer and the charge may be collected by using a POS of a convenience store.

In the first to fifth embodiments, the case where one of two binary images of the dotted background image and the error-diffused background image is selected in accordance with a mask image, thereby generating a latent-image-buried image in which the mask image is buried as a latent image has been described. The method of generating a latent-image-buried image is not limited to this method. For example, a small image pattern corresponding to one cell of dithering is repeatedly formed in the whole screen, thereby forming a dither image. By replacing only the mask image portion with other small image patterns formed by an error diffusing process, a latent-image-buried image in which the mask image is buried as a latent image can be generated.

In the first to fifth embodiments, the case where document data is converted to image data described in the PDL and the image data is merged with the latent-image-buried image data has been described. It is also possible to convert document data into a binary image, convert the binary image into a raster image, and merge the raster image with latent-image-buried image data by OR merging.

In the first to fifth embodiments, the case of operating a terminal disposed in a convenience store to retrieve secret document data (for example, certificate of residence, copy of one's family register, or document certifying that a seal is registered) from the database of a city office, and outputting the retrieved data from a printer disposed in the same store has been described. The invention can also be applied to all cases of forming an image, based on forgery prevention target image data to be protected from copy-based forgery, such as a case of outputting a document describing data of registered people from a database of an employee-leasing company, a case of outputting a contract sheet or the like from the database of a bank or securities company, a case of outputting a contract sheet or the like from the database of a nonlife insurance company, a case of outputting an airline ticket, a show ticket, or the like, and a case of outputting a picture (of a star).

In the first to fifth embodiments, the case of selecting or generating latent-image-buried image data in accordance with the kind of a certificate or the like and merging the latent-image-buried image data with document data has been described as an example. In the case where a document to be outputted is not a secret document such as a notification from a city office, it can be arranged not to add the latent-image-buried image data to the document. In the case of outputting an airline ticket or the like for a member, after authenticating the identification and membership of the user by the ID card or member card, it can also be arranged not to add latent-image-buried image data as a service for the member.

In the first to fifth embodiments, the position of forming the mask image in the latent-image-buried image data is not especially limited. It is also possible to merge the document image data with the latent-image-buried image data so that specific information having high confidentiality in document data and a mask image are overlapped with each other. By merging the document image data with the latent-image-buried image data so as to overlap specific information having high confidential in document data and a mask image with each other, for example, a portion of the mayor's seal in a certificate issued by a city office and a mask image, a seal portion in a document certifying that a seal is registered and a mask image, and an amount written portion in a security and a mask image, it becomes more difficult to forge the resultant document.

Figure 19:
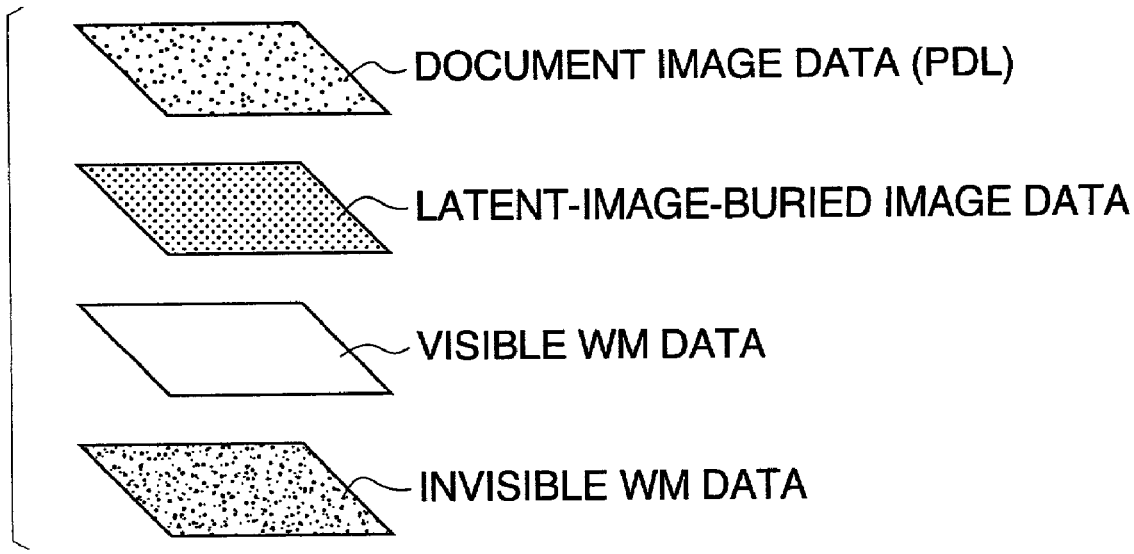
FIG. 19 is a diagram showing the kinds of image data to be merged.

Although the case of merging the latent-image-buried image data as copy forgery preventing image data with the document image data has been described in the first to fifth embodiments, copy forgery preventing image data other than the latent-image-buried image data can also be used. As shown in FIG. 19, in addition to the latent-image-buried image data, image data such as a visible watermark (visible WM) or invisible watermark (invisible WM) can be selected and merged as appropriate.

Although, in the above-described first to fifth embodiments, an example of specifying the kind of a document to be outputted and other information by operating a terminal placed in a convenience store has been described, the kind of document and other information may be specified by operating the control panel and the like of a printer to output to. Also in this case, with latent-image-buried image data stored in advance in correspondence with IP addresses, by specifying a printer IP address in a DB server, latent-image-buried image data corresponding to printer property information (printer resolution, tone property, and the number of colors) can be selected. Alternatively, when the DB server inquires of the printer the status thereof, the property information of the printer may have been passed in advance to the DB server from the printer.

In the embodiments described so far, a one-to-one correspondence between characteristics of image forming apparatuses and pieces of copy forgery preventing image data is not always required. If characteristics of plural image forming apparatuses are different to some extent, a piece of copy forgery preventing image data can be stored or generated corresponding to those characteristics of the image forming apparatuses to obtain the same effect as in the case of one-to-one correspondence.

According to the present invention, since copy forgery preventing image data corresponding to the characteristics of image forming apparatuses to form images is outputted to the image forming apparatuses for forming images, based on forgery prevention target image data to be protected from copy-based forgery, satisfactory images can be formed regardless of the characteristics of the image forming apparatuses.

When the copy forgery preventing image data from a storing part in which the data is prestored is selected, an effect is produced such that the time required to output a recording medium on which the merged data is printed can be short.

When copy forgery preventing image data is generated by a generating part, the storage capacity of a database is reduced.

The entire disclosure of Japanese Patent Application No. 2000-255324filed on Aug. 25, 2000 including specification, claims, drawings and abstract is incorporated herein by reference in its entirety.

What is claimed is:

1. An image data outputting apparatus for outputting copy forgery preventing image data for preventing copy-based forgery, comprising:

storing means for storing a plurality of pieces of copy forgery preventing image data corresponding to image forming characteristics of a plurality of image forming apparatuses, wherein an image forming characteristic of an image forming apparatus corresponds to a resolution of the image forming apparatus;

selecting means for selecting a piece of copy forgery preventing image data based on an image forming apparatus that is specified for forming the image from among the plurality of image forming apparatuses, the copy forgery preventing image data corresponding to the image forming characteristic of the image forming apparatus specified for forming an image stored in the storing means; and outputting means for outputting the piece of copy forgery preventing image data selected by the selecting means to the image forming apparatus specified for forming an image by printing, wherein:

the piece of copy forgery preventing image data includes at least a background portion constituted by a first pattern and a latent image portion constituted by a second pattern; and the selecting means selects the piece of copy forgery preventing image data so that, when an image is formed by the specified image forming apparatus, the background portion and the latent image portion are almost equal in density.

2. The image data outputting apparatus according to claim 1, the image forming characteristic of the image forming apparatus further corresponds to at least one of a tone property and a number of colors of the image forming apparatus.

3. The image data outputting apparatus according to claim 1, wherein each of the plurality of image forming apparatuses corresponds to a different model.

4. An image data outputting method for outputting copy forgery preventing image data for preventing copy-based forgery, the method comprising the steps of:

storing a plurality of pieces of copy forgery preventing image data corresponding to image forming characteristics of a plurality of image forming apparatuses in storing means:

selecting a piece of copy forgery preventing image data based on an image forming apparatus that has been specified for forming an image from the plurality of image forming apparatuses, the copy forgery preventing image data corresponding to an image forming characteristic of the image forming apparatus specified for forming the image, wherein the image forming characteristic of the image forming apparatus corresponds to a resolution of the image forming apparatus; and outputting the selected piece of copy forgery preventing image data to the image forming apparatus specified for forming an image by printing, wherein:

the piece of copy forgery preventing image data includes at least a background portion constituted by a first pattern and a latent image portion constituted by a second pattern, and the background portion and the latent image portion are almost equal in density.

5. The image data outputting method according to claim 4, the image forming characteristic of the image forming apparatus further corresponds to at least one of a tone property and a number of colors of the image forming apparatus.

* * * * *